(12) United States Patent
Azarnoush et al.

(10) Patent No.: US 12,391,586 B2
(45) Date of Patent: Aug. 19, 2025

(54) COMPOSITIONS AND METHODS FOR TREATING WASTEWATER

(71) Applicant: KEMIRA OYJ, Helsinki (FI)

(72) Inventors: Fazlollah Azarnoush, Helsinki (FI); Roger Barstrom, Odakra (SE)

(73) Assignee: KEMIRA OYJ, Helsinki (FI)

( * ) Notice: Subject to any disclaimer, the term of this patent is extended or adjusted under 35 U.S.C. 154(b) by 128 days.

(21) Appl. No.: 17/632,897

(22) PCT Filed: Aug. 6, 2020

(86) PCT No.: PCT/US2020/045193
§ 371 (c)(1),
(2) Date: Feb. 4, 2022

(87) PCT Pub. No.: WO2021/026346
PCT Pub. Date: Feb. 11, 2021

(65) Prior Publication Data
US 2024/0140839 A1    May 2, 2024

Related U.S. Application Data

(60) Provisional application No. 62/883,200, filed on Aug. 6, 2019.

(30) Foreign Application Priority Data

Sep. 10, 2019   (FI) .................................... 20195746

(51) Int. Cl.
*C02F 1/52*    (2023.01)
*C02F 1/50*    (2023.01)
(Continued)

(52) U.S. Cl.
CPC .............. *C02F 1/5245* (2013.01); *C02F 1/50* (2013.01); *C02F 1/72* (2013.01);
(Continued)

(58) Field of Classification Search
CPC .. C02F 1/50; C02F 1/5245; C02F 1/56; C02F 1/66; C02F 1/72; C02F 1/722; C02F 1/76;
(Continued)

(56) References Cited

U.S. PATENT DOCUMENTS 10,035,966 B1   7/2018  Cox et al.
10,131,558 B1   11/2018 Cox et al.
(Continued)

FOREIGN PATENT DOCUMENTS

CN    101874968 A    11/2010
CN    103241824 A    8/2013
(Continued)

OTHER PUBLICATIONS

Anonymous, "Citric Acid." Enologica Vason S.p.A, Mar. 29, 2016 [retrieved from internet on Oct. 15, 2020, https://www.vason.com/uploads/MediaGalleryArticoliDocumenti/Acido%20Citrico%202_1-1.pdf], one page.

*Primary Examiner* — Dirk R Bass
(74) *Attorney, Agent, or Firm* — Robin L. Teskin; Baker, Donelson, Bearman, Caldwell & Berkowitz PC

(57) ABSTRACT

The present embodiments generally relate to compositions and methods for the treatment of fluids in need of treatment, such as, for example, industrial wastewaters. The compositions and methods for treating the fluids in need of treatment generally comprises the use of one or more stable ferrous products in amounts effective to treat said fluids.

10 Claims, 3 Drawing Sheets

(51) Int. Cl.
*C02F 1/72* (2023.01)
*C02F 101/10* (2006.01)
*C02F 101/32* (2006.01)
*C02F 103/10* (2006.01)

(52) U.S. Cl.
CPC .... *C02F 2101/101* (2013.01); *C02F 2101/32* (2013.01); *C02F 2103/10* (2013.01); *C02F 2209/06* (2013.01)

(58) Field of Classification Search
CPC ............ C02F 2101/101; C02F 2101/32; C02F 2103/007; C02F 2103/023; C02F 2103/06; C02F 2103/08; C02F 2103/10; C02F 2103/16; C02F 2103/18; C02F 2103/28; C02F 2103/365; C02F 2209/06; C02F 2303/04; C02F 2303/08
See application file for complete search history.

(56) References Cited

U.S. PATENT DOCUMENTS

2010/0300962 A1    12/2010  Semenza
2011/0309017 A1*   12/2011  Hassler .................... B01J 41/14
                                                        210/764

FOREIGN PATENT DOCUMENTS

| CN | 105233649 A | 1/2016 |
| CN | 105712495 A | 6/2016 |
| CN | 106554059 | 4/2017 |
| CN | 108218073 | 6/2018 |
| CN | 108275788 | 7/2018 |
| CN | 109987750 | 7/2019 |
| WO | 2008079652 | 7/2008 |
| WO | 2017202969 | 11/2017 |

* cited by examiner

COMPOSITIONS AND METHODS FOR TREATING WASTEWATER

RELATED APPLICATIONS

This application is a U.S. National Phase application of Int'l Appl. No. PCT/US2020/045193, filed Aug. 6, 2020, which claims priority to Finnish Appl. No. 20195746, filed Sep. 10, 2019, and claims benefit of U.S. Provisional Appl. No. 62/883,200, filed Aug. 6, 2019, each of which are incorporated herein by reference in their entireties.

FIELD OF THE ART

The present disclosure generally relates to compositions and methods for the treatment of fluids in need of treatment, such as, for example, wastewater resulting from industrial processes and/or fluids comprising hydrogen sulfide, wherein treating said fluids reduces the amount of and/or removes contaminants from the fluids in need of treatment.

BACKGROUND

Fluids in need of treatment, such as industrial wastewaters, commonly include a variety of contaminants that require treatment to reduce the amount of and/or remove such contaminants from the fluids before the treated fluids can be discharged and/or reused. Contaminants, such as sulfides and other compounds, dissolved in fluids in need of treatment have been recognized as causing problems in lines carrying such fluids. For example, the emission of $H_2S$ gas from wastewater increases the corrosion in the wastewater pipes that transport that wastewaters. In some instances, dissolved sulfides, such as, for example, hydrogen sulfide ($H_2S$), can be generated in a fluid in need of treatment when organic matter comprised by the fluid are degraded through anaerobic digestion by micro-organisms For example, hydrogen sulfide ($H_2S$) may be formed when sulfate and sulfur compounds (organic and inorganic) are reduced by microorganisms, sometimes referred to as "digesters", in anaerobic environments, such as sewer networks or static water reservoirs.

The level of contaminants in a fluid in need of treatment can, however, be controlled using products comprising various different chemical compounds. Oftentimes, when a fluid in need of treatment comprises sulfide whose removal is desired, the products used to treat such fluids are of a highly acidic pH (less than 1) or of a highly basic pH (pH of greater than 13). Consequently, the use of highly acidic products can increase the acidity of the treated fluid, which generally is not a desirable effect. Moreover, highly acidic and highly basic products are many times categorized as "hazardous products", and therefore require extra transportation and/or shipping costs. Furthermore, such products may require specialized equipment, such as double-wall tankage and piping systems, which also represent additional costs to users of such products. As such, the development of compositions and methods for treating fluids in need of treatment is of much interest in the field.

BRIEF SUMMARY

The present disclosure generally relates to a coagulant composition suitable for the treatment of a fluid in need of treatment, one or more coagulants, which one or more coagulants comprise at least one stable ferrous product, wherein said stable ferrous product comprises: (i) one or more ferrous ($Fe^{2+}$) comprising compounds; (ii) one or more citrate-based stabilizers; and (iii) a pH value of from 3.00 to 6.99, wherein said one or more citrate-based stabilizers maintain the stability of said coagulant composition and/or prevent the oxidation of said ferrous compound in said coagulant composition. In some embodiments, the stable ferrous product may comprise less than 5.0% by weight of said citrate-based stabilizer, optionally from about 0.10% to about 4.99% of said citrate-based stabilizer by weight, further optionally from about 0.10% to about 3.00% by weight of said citrate-based stabilizer. In some embodiments, the stable ferrous product comprises more than 5.0% of Fe by weight. In some embodiments, the composition may comprise less than 30% by weight of hydrogen peroxide, optionally less than 25% by weight of hydrogen peroxide, further optionally less than 20, 10 or 5% by weight of hydrogen peroxide, and still further optionally does not comprise any appreciable or biocidally effective amount of hydrogen peroxide. In some embodiments, said one or more ferrous comprising compounds may include ferrous sulfate and ferrous chloride. In some embodiments, said one or more ferrous comprising compounds may include ferrous chloride tetrahydrate and/or ferrous chloride from spent pickling liquor. In some embodiments, said one or more ferrous comprising compounds may include ferrous sulfate which comprises copperas. In some embodiments, the pH value may be from about 4.00 to about 6.00. In some embodiments, the citrate-based stabilizer may comprise sodium citrate and/or trisodium citrate and/or citric acid. In some embodiments, the coagulant composition may comprise soda ash. In some embodiments, the stable ferrous product may comprise about 2% or less, about 2% or more, about 2.5% or more, about 3.0% or more, about 3.5% or more, about 4.0% or more, about 4.5% or more, about 5.0% or more, about 5.5% or more, about 6.0% or more, about 6.5% or more, about 7.0% or more, about 7.5% or more, about 8.0% or more, about 8.5% or more, about 9.0% or more, about 9.5% or more, about 10.0% or more, about 11.0% or more, about 12.0% or more, about 13.0% or more, about 14.0% or more, or about 15.0% or more Fe by weight. In some embodiments, the stable ferrous product may comprise about 0.10% or less, about 0.10% or more, about 0.20% or more, about 0.30% or more, about 0.40% or more, about 0.50% or more, about 0.75% or more, about 1.00% or more, about 1.25% or more, about 1.50% or more, about 1.75% or more, about 2.00% or more, about 2.25% or more, about 2.50% or more, about 2.75% or more, or about 3.00% or more of stabilizer by weight. In some embodiments, the stable ferrous product may comprise from about 2% to about 15% Fe by weight, about 0.1% to about 3.0% citrate by weight, and comprise a pH value for from about 3.0 to about 6.0.

In some embodiments, the stable ferrous product may be stable at 0° C. for 1 week or more, for 2 weeks or more, for 3 weeks or more, for 4 weeks or more, for 5 weeks or more, for 6 weeks or more, for 7 weeks or more, for 8 weeks or more, for 9 weeks or more, for 10 weeks or more, for 12 weeks or more, for 14 weeks or more, for 16 weeks or more, for 18 weeks or more, for 20 weeks or more, for 22 weeks or more, or for 24 weeks or more. In some embodiments, the stable ferrous product may be stable at 20° C. for 1 week or more, for 2 weeks or more, for 3 weeks or more, for 4 weeks or more, for 5 weeks or more, for 6 weeks or more, for 7 weeks or more, for 8 weeks or more, for 9 weeks or more, for 10 weeks or more, for 12 weeks or more, for 14 weeks or more, for 16 weeks or more, for 18 weeks or more, for 20 weeks or more, for 22 weeks or more, or for 24 weeks or more. In some embodiments, the stable ferrous product may be stable at room temperature for 1 week or more, for 2 weeks or more, for 3 weeks or more, for 4 weeks or more, for 5 weeks or more, for 6 weeks or more, for 7 weeks or more, for 8 weeks or more, for 9 weeks or more, for 10 weeks or more, for 12 weeks or more, for 14 weeks or more, for 16 weeks or more, for 18 weeks or more, for 20 weeks or more, for 22 weeks or more, or for 24 weeks or more. In some embodiments, the stable ferrous product may be stable at 50° C. for 1 week or more, for 2 weeks or more, for 3 weeks or more, for 4 weeks or more, for 5 weeks or more, for 6 weeks or more, for 7 weeks or more, for 8 weeks or more, for 9 weeks or more, for 10 weeks or more, for 12 weeks or more, for 14 weeks or more, for 16 weeks or more, for 18 weeks or more, for 20 weeks or more, for 22 weeks or more, or for 24 weeks or more. In some embodiments, the stable ferrous product may be non-corrosive, optionally wherein non-corrosion is determined by the United Nations test method standard. In some embodiments, the stable ferrous product may result in less than 13.5% mass loss of a metal specimen, optionally comprised of aluminum or steel, when the exposure time of the metal specimen with said stable ferrous product is 7 days. In some embodiments, the stable ferrous product may be non-corrosive to steel. In some embodiments, the stable ferrous product may be non-corrosive to aluminum. In some embodiments, the corrosion rate of said stable ferrous product may be 6.25 or less, 6.0 or less, 5.5 or less, 5.0 or less, 4.5 or less, 4.0 or less, 3.5 or less, 3.0 or less, 2.5 or less, 2.0 or less, 1.5 or less, or 1.0 or less mm/year at 55° C. steel and/or aluminum coupons.

In some embodiments, said coagulant composition may further comprise a fluid in need of treatment. In some embodiments, said fluid in need of treatment may comprise sulfide, optionally at least 1 mg/kg sulfide concentration, further optionally at least 5 mg/kg sulfide concentration. In some embodiments, said coagulant composition comprising a fluid in need of treatment further may comprise one or more digesters. In some embodiments, said fluid in need of treatment may comprise a fluid used in, or in conjunction with, or as a part of a process of, any one or more of the following: sewer networks; pumping stations; wastewater treatment plants, deep and shallow wells, poorly constructed wells close to sewer lines, surface water that is close to a septic system; industrial effluent; static contaminated water; and/or wastewater comprising digesters, e.g., microorganisms for effecting anaerobic digestion, e.g., those that may be added at wastewater treatment plants. In some embodiments, said fluid in need of treatment may comprise any of heavy metals, oil, grease, and/or sludge. In some embodiments, said fluid in need of treatment may comprise effluent. In some embodiments, said fluid in need of treatment may comprise produced water. In some embodiments, a fluid in need of treatment may comprise sewage water.

In some embodiments, said composition may comprise any one or more of the following: one or more other coagulants in addition to said at least one stable ferrous product; one or more biocides; one or more oxidizing biocides; one or more non-oxidizing biocides.

Furthermore, the present disclosure generally relates to a method for treating a fluid in need of treatment, wherein said method comprises adding an effective amount of at least one coagulant composition as described herein.

Moreover, the present disclosure generally relates to a method for treating a fluid in need of treatment, wherein said method comprises a. providing a fluid in need of treatment; b. adding to said fluid in need of treatment at least one coagulant composition which comprises one or more stable ferrous in an amount effective to treat said fluid in need of treatment; and c. mixing the fluid in need of treatment and the one or more stable ferrous products to effect treatment of said fluid; wherein the one or more stable ferrous products comprise (i) one or more ferrous ($Fe^{2+}$) comprising compounds, (ii) one or more citrate-based stabilizers; and (iii) a pH value of from 3.00 to 6.99. In some embodiments, the one or more stable ferrous products may comprise less than 5.0% by weight of citrate-based stabilizer, optionally from about 0.10% to about 4.99% by weight of citrate-based stabilizer, further optionally from about 0.10% to about 3.00% by weight of citrate-based stabilizer. In some embodiments, the one or more stable ferrous products may comprise more than 5.0% of Fe by weight. In some embodiments, said coagulant composition comprises less than 30% by weight of hydrogen peroxide, optionally less than 25% by weight of hydrogen peroxide, further optionally less than 20, 10 or 5% by weight hydrogen peroxide, still further optionally being devoid of any appreciable or biocidally effective amount of hydrogen peroxide. In some embodiments, said fluid in need of treatment may comprise sulfide, optionally at least 1 mg/kg sulfide concentration, further optionally at least 5 mg/kg sulfide concentration. In some embodiments, treatment of said fluid may result in 75% or less, 75% or more, 80% or more, 85% or more, 90% or more, 95% or more, 99% or more, or 100% removal of sulfide from said fluid in need of treatment. In some embodiments, said one or more ferrous comprising compounds may include ferrous sulfate and ferrous chloride. In some embodiments, said ferrous chloride may comprise ferrous chloride tetrahydrate and/or ferrous chloride from spent pickling liquor. In some embodiments, said one or more ferrous comprising compounds may include ferrous sulfate which comprises copperas. In some embodiments, the pH value may be from about 4 to about 6. In some embodiments, the citrate-based stabilizer may comprise trisodium citrate. In some embodiments, the one or more stable ferrous products may comprise about 2% or less, about 2% or more, about 2.5% or more, about 3.0% or more, about 3.5% or more, about 4.0% or more, about 4.5% or more, about 5.0% or more, about 5.5% or more, about 6.0% or more, about 6.5% or more, about 7.0% or more, about 7.5% or more, about 8.0% or more, about 8.5% or more, about 9.0% or more, about 9.5% or more, about 10.0% or more, about 11.0% or more, about 12.0% or more, about 13.0% or more, about 14.0% or more, or about 15.0% or more Fe by weight. In some embodiments, the one or more stable ferrous products may comprise about 0.10% or less, about 0.10% or more, about 0.20% or more, about 0.30% or more, about 0.40% or more, about 0.50% or more, about 0.75% or more, about 1.00% or more, about 1.25% or more, about 1.50% or more, about 1.75% or more, about 2.00% or more, about 2.25% or more, about 2.50% or more, about 2.75% or more, or about 3.00% or more of stabilizer by weight. In some embodiments, said one or more stable ferrous products may comprise from about 2% to about 15% Fe by weight, about 0.1% to about 3.0% citrate by weight, and a pH value for from about 3.0 to about 6.0.

In some embodiments, the one or more stable ferrous products may be stable at 0° C. for 1 week or more, for 2 weeks or more, for 3 weeks or more, for 4 weeks or more, for 5 weeks or more, for 6 weeks or more, for 7 weeks or more, for 8 weeks or more, for 9 weeks or more, for 10 weeks or more, for 12 weeks or more, for 14 weeks or more, for 16 weeks or more, for 18 weeks or more, for 20 weeks or more, for 22 weeks or more, or for 24 weeks or more. In some embodiments, the one or more stable ferrous products may be stable at 20° C. for 1 week or more, for 2 weeks or more, for 3 weeks or more, for 4 weeks or more, for 5 weeks or more, for 6 weeks or more, for 7 weeks or more, for 8 weeks or more, for 9 weeks or more, for 10 weeks or more, for 12 weeks or more, for 14 weeks or more, for 16 weeks or more, for 18 weeks or more, for 20 weeks or more, for 22 weeks or more, or for 24 weeks or more. In some embodiments, the one or more stable ferrous products may be stable at room temperature for 1 week or more, for 2 weeks or more, for 3 weeks or more, for 4 weeks or more, for 5 weeks or more, for 6 weeks or more, for 7 weeks or more, for 8 weeks or more, for 9 weeks or more, for 10 weeks or more, for 12 weeks or more, for 14 weeks or more, for 16 weeks or more, for 18 weeks or more, for 20 weeks or more, for 22 weeks or more, or for 24 weeks or more. In some embodiments, the one or more stable ferrous products are stable at 50° C. for 1 week or more, for 2 weeks or more, for 3 weeks or more, for 4 weeks or more, for 5 weeks or more, for 6 weeks or more, for 7 weeks or more, for 8 weeks or more, for 9 weeks or more, for 10 weeks or more, for 12 weeks or more, for 14 weeks or more, for 16 weeks or more, for 18 weeks or more, for 20 weeks or more, for 22 weeks or more, or for 24 weeks or more.

In some embodiments, the one or more stable ferrous products may be non-corrosive. In some embodiments, the one or more stable ferrous products may be non-corrosive by the United Nations test method standard. In some embodiments, the stable ferrous product may result in less than 13.5% mass loss of a metal specimen when the exposure time is 7 days to said stable ferrous product. In some embodiments, the stable ferrous product may be non-corrosive to steel. In some embodiments, the stable ferrous product may be non-corrosive to aluminum. In some embodiments, the corrosion rate of said stable ferrous product may be 6.25 or less, 6.0 or less, 5.5 or less, 5.0 or less, 4.5 or less, 4.0 or less, 3.5 or less, 3.0 or less, 2.5 or less, 2.0 or less, 1.5 or less, or 1.0 or less mm/year at 55° C. steel and/or aluminum coupons. In some embodiments, the fluid in need of treatment may comprise one or more digesters. In some embodiments, the fluid in need of treatment may comprise fluid used in, or in conjunction with, or as a part of a process of, any one or more of the following: sewer networks; pumping stations; wastewater treatment plants, deep and shallow wells, poorly constructed wells close to sewer lines, surface water that is close to a septic system; industrial effluent; static contaminated water; and/or wastewater comprising digesters, e.g., microorganisms for effecting anaerobic digestion, e.g., those that may be added at wastewater treatment plants. In some embodiments, the fluid in need of treatment may comprise heavy metals, oil, grease, and/or sludge. In some embodiments, the fluid in need of treatment may comprise effluent. In some embodiments, the fluid in need of treatment may comprise produced water. In some embodiments, the method may further comprise adding one or more other coagulants to said fluid in need of treatment. In some embodiments, said method may further comprise adding one or more biocides to said fluid in need of treatment. In some embodiments, said method may further comprise adding one or more oxidizing biocides and/or one or more non-oxidizing biocides to said fluid in need of treatment. In some embodiments, said method may comprise adding an amount of one or more stable ferrous products to said fluid in need of treatment that is effective to remove one or more contaminants from said fluid in need of treatment.

Moreover, the present disclosure generally relates to a method of producing a stable ferrous product, wherein said method comprises: a. providing a solution comprising ferrous; b. neutralizing free acid (in case of acidic solutions); c. reducing $Fe^{3+}$ to $Fe^{2+}$ (if ferric ions are present, e.g., from spent pickling liquor as a source of ferrous); d. increasing the pH by adding a soda ash; e. filtering the solution; f adding one or more citrate-based stabilizers to the solution; g. adjusting the pH to final target; and, optionally h. filtering the solution prior to storage and/or use.

Furthermore, the present disclosure generally relates to a composition comprising a fluid in need of treatment and one or more stable ferrous products, wherein said one or more stable ferrous products comprise from about 2% to about 15% Fe by weight, about 0.1% to about 3.0% citrate by weight, and a pH value for from about 3.0 to about 6.0. Moreover, the present disclosure generally relates to a composition comprising a fluid in need of treatment and one or more stable ferrous products, wherein said fluid in need of treatment comprises sulfide, and said one or more stable ferrous products comprise from about 2% to about 15% Fe by weight, about 0.1% to about 3.0% citrate by weight, and a pH value for from about 3.0 to about 6.0, and optionally wherein said fluid in need of treatment comprises sulfide, further optionally at least 1 mg/kg sulfide concentration, further optionally at least 5 mg/kg sulfide concentration.

Moreover, the present disclosure generally relates to a coagulant composition suitable for the treatment of a fluid in need of treatment, wherein said coagulant composition comprises one or more stable ferrous products, wherein said stable ferrous products comprise (i) one or more ferrous ($Fe^{2+}$) comprising compounds, optionally wherein the one or more stable ferrous products comprise more than 5.0% of Fe by weight; (ii) one or more citrate-based stabilizers, optionally wherein the one or more stable ferrous products comprise less than 5.0% by weight of citrate-based stabilizer, further optionally from about 0.10% to about 4.99% by weight of citrate-based stabilizer, further optionally from about 0.10% to about 3.00% by weight of citrate-based stabilizer; (iii) a pH value of from 3.00 to 6.99, optionally from about 3.0 to about 6.0; wherein said one or more citrate-based stabilizers maintains the stability of said composition and/or prevents the oxidation of said ferrous compound in said composition, further wherein said composition comprises less than 30% by weight hydrogen peroxide, optionally less than 25% by weight hydrogen peroxide, further optionally less than 20, 10 or 5% by weight hydrogen peroxide, and further optionally lacking any appreciable or biocidally effective amount of hydrogen hydroxide.

Moreover, the present disclosure generally relates to a method of treating a gas stream in need of treatment, e.g., any gaseous stream which may comprise contaminants, such as hydrogen sulfide gas. In some embodiments, said gas streams in need of treatment include, but are not limited to, any one or more of the following: air, natural gas, $CO_2$, amine acid gas, biogas, landfill gas, refinery fuel gas, and the like. In some embodiments, said method may comprise adding an amount of one or more stable ferrous products to said gas stream in need of treatment that is effective to remove one or more contaminants from said gas stream in need of treatment. In some embodiments, the dosage of one or more stable ferrous products may be an amount that is determined at least in part by the volume and/or the concentration of the one or more gases comprised by a gas stream. In some instances, a gas stream in need of treatment may be treated by using an absorption column and a solution comprising one or more stable ferrous products, wherein the amount and/or concentration of iron solution used is based at least in part on the volume and/or concentration of one or more gases comprised by the gas stream in need of treatment.

DETAILED DESCRIPTION

Definitions

Figure 1:
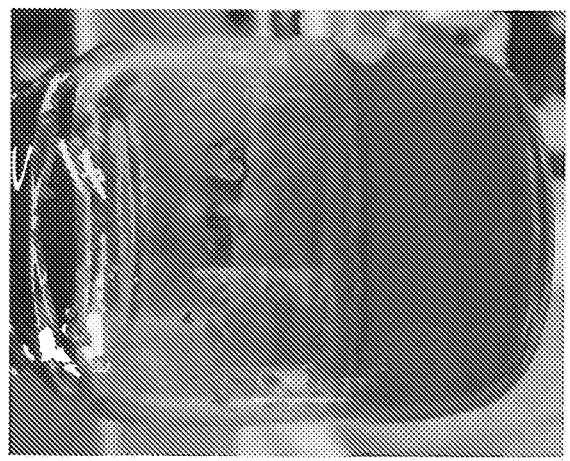
FIG. 1 presents an image of a composition comprising a conventional ferrous product comprising ferrous chloride and no stabilizer at a pH value of 4, in accordance with Example 2.

As used herein the singular forms "a", "an", and "the" include plural referents unless the context clearly dictates otherwise. All technical and scientific terms used herein have the same meaning as commonly understood to one of ordinary skill in the art to which this invention belongs unless clearly indicated otherwise.

As used herein, the term "fluid in need of treatment" generally refers to any fluid and/or aqueous liquid feed that contains undesirable amounts of contaminants, such as, for example sulfide-containing compounds, e.g., hydrogen sulfide, heavy metals, oil, grease, and/or sludge. In some instances, hydrogen sulfide may be formed in a fluid in need of treatment when sulfate and sulfur compounds (organic and/or inorganic) are produced by microorganisms in an anaerobic environment, such as, for example, a sewer network or a static water reservoir. In some instances, sulfide may be present in a fluid in need of treatment wherein the source of said sulfide comprises hydrogen sulfide, zinc sulfide, and/or lead sulfide, and/or any other form of sulfide known in the art. In some instances, a fluid in need of treatment may comprise a fluid used in, or in conjunction with, or as a part of a process of, any one or more of the following: sewer networks; pumping stations; wastewater treatment plants; deep and shallow wells; poorly constructed wells close to sewer lines; surface water that is close to a septic system; industrial effluent; static contaminated water; and wastewater comprising digesters, e.g., microorganisms for effecting anaerobic digestion, e.g., those that may be added at wastewater treatment plants. In some embodiments, a fluid in need of treatment may comprise effluent. In some embodiments, a fluid in need of treatment may comprise sewage water.

In some embodiments, a fluid in need of treatment may include, but is not limited to including, drinking water, ground water, well water, surface water, such as waters from lakes, ponds and wetlands, agricultural waters, wastewater, such as wastewater or leaching water from mining or industrial processes, industrial wastewater, geothermal fluids, water from mining processes associated with smelting, mine dewatering, tailing impoundment treatment, chemical induced leaching, flotation, autoclave, acid mine drainage, wastewater from flue gas, desulfurization units, runoff from wet fly ash ponds, and groundwater streams, and the like. In some embodiments, the fluid in need of treatment may be produced from a mining process, for example a smelting process, such a smelting process gold, copper, iron, nickel, silver, phosphate, coal or molybdenum; or processes associated with mine dewatering, tailing impoundment treatment, chemical induced leaching, flotation, autoclave, acid mine drainage, and the like. In some embodiments, a fluid in need of treatment may comprise produced water. In some embodiments, a fluid in need of treatment may comprise water related to gas production and/or gas exploration processes. In some embodiments, a fluid in need of treatment may comprise sea water or other brackish water. In some embodiments, a fluid in need of treatment may comprise boiler water, cooling water, seawater (e.g., in oil platform applications), brackish water, oilfield water, municipal treatment plant water, paper mill water (such as water used to process pulp, paper, and/or cardboard), mining water, water resulting from any part of a method associated with enhanced oil recovery, reverse osmosis process water, water used in geothermal applications or methods, water resulting from gas recovery, water resulting from oil recovery, and/or industrial treatment plant water. In some instances, a fluid in need of treatment may comprise a circulating fluid. In some embodiments, the circulating fluid is utilized in, or is a component of, a mining process, or is in a system that is utilized in a mining process. In some embodiments, the circulating fluid is utilized in, or is a component of, a pulp, paper, and/or cardboard-related process, or is in a system that is utilized in the processing of pulp, paper, and/or cardboard. In some embodiments, the circulating fluid is utilized in, or is a component of, an oil and gas exploration or production process, or is in a system that is utilized in an oil and gas exploration and production process. In some embodiments, the circulating fluid is utilized in, or is a component of, coal processing, or is in a system that is utilized in coal processing (e.g., coal slurry transport). In some embodiments, the circulating fluid is utilized in, or is a component of a reverse osmosis process. In some embodiments, the circulating fluid is utilized in, or is a component of a geothermal application or method.

As used herein, the term "gas stream in need of treatment" generally refers to any gaseous stream which may comprise contaminants, such as hydrogen sulfide gas. For example, such gas streams in need of treatment include, but are not limited to, any one or more of the following: air, natural gas, $CO_2$, amine acid gas, biogas, landfill gas, refinery fuel gas, and the like.

As used herein, the term "produced water" generally refers to any aqueous fluid produced during any type of industrial process, e.g., an oil or gas extraction or recovery process, e.g., a mining process, e.g., a pulp, paper, or cardboard process, e.g., a coal transport process, or any portion thereof, such as but not limited to any enhanced oil recovery process or any portion thereof. Typically, the produced water may be obtained or produced during an industrial process involving the use of water, and, in some instances, the use of one or more water soluble polymers. In some instances, produced water may comprise one or more contaminants, e.g., sulfide-containing contaminants.

As used herein, the term "coagulant" generally refers to an agent that may destabilize colloidal suspensions. Coagulants may comprise iron-containing coagulants such as ferrous chloride, ferric chloride, ferric chloride sulfate, iron chloride, iron sulfate, ferric sulfate, ferrous sulfate, and polyferric sulfate. Additional coagulants may include but are not limited to including inorganic coagulants such as aluminium sulfate ("ALS") and other metal sulfates, organic coagulants such as polyamines and polyDADMACs, cationic polyacrylamides (cPAMs) of various molecular weights and charges, and other inorganic and organic coagulants known in the art. An inorganic coagulant may, for example, reduce, neutralize or invert electrical repulsions between particles. Inorganic coagulants may comprise but are not limited to inorganic salts such as aluminum chloride, aluminum sulfate, aluminum chlorohydrate, polyaluminum chloride, polyaluminum silica sulfate, ferric chloride, ferrous chloride, ferric sulfate, ferric chloride sulfate, polyferric sulfate, ferrous sulfate, lime, calcium chloride, calcium sulfate, magnesium chloride, sodium aluminate, various commercially available iron or aluminum salts coagulants, or combinations thereof.

As used herein, the term "coagulant composition" generally refers to any composition comprising at least one coagulant as above-defined; generally such coagulants will comprise stable ferrous products. In some instances, the coagulants composition may comprise one or more coagulants, wherein at least one of said one or more coagulants comprise a stable ferrous product. In some instances the coagulant composition may be comprised in or added to a fluid in need of treatment.

As used herein, the term "iron" generally refers to any form of iron, for example, iron of any isotopic state, iron of any oxidation state, any form of an iron compound, such as, for example, iron (III) chloride, iron (II) chloride (also known as ferrous chloride), iron (III) chloride hexahydrate, and iron sulfate. In some embodiments, iron may comprise iron (II).

As used herein, the term "ferrous product" generally refers to a composition comprising Fe (II) (ferrous). Such ferrous products may be, for example, compositions comprising ferrous chloride and/or ferrous sulfate. In some instances, ferrous products may be used in the treatment of fluids in need of treatment, e.g., as an iron-based coagulant. A "conventional ferrous product" generally comprises a composition comprising iron (II), further wherein the pH of said conventional ferrous product is less than 3. Furthermore, if the pH of a conventional ferrous product is raised above 3, such a conventional ferrous product typically demonstrates undesirable properties, such as precipitating from solution in less than one day, and in some cases less than one hour. Furthermore, such conventional ferrous products are generally labeled as hazardous materials due to their corrosive nature, which can lead to high costs for transport and usage.

As used herein, the term "stable ferrous product" generally refers to a composition comprising Fe (II), such as, for example, a composition comprising ferrous sulfate and/or ferrous chloride, wherein the pH of a composition comprising a stable ferrous product is from 3 to less than 7, e.g., from about 4 to about 6, and further wherein said composition comprises one or more citrate-based stabilizers, wherein said one or more citrate-based stabilizers maintains the stability of said composition and/or prevents the oxidation of said ferrous compound in said composition. In some embodiments, said one or more citrate-based stabilizers may comprise sodium citrate. In some embodiments, said one or more citrate-based stabilizers may comprise trisodium citrate. In some embodiments, said one or more citrate-based stabilizers may comprise citric acid, wherein optionally the pH may be adjusted to compensate for $H^+$ which may result from the addition of citric acid. In some embodiments, the pH of a stable ferrous product may be about 3.0 or more, about 3.25 or more, about 3.50 or more, about 4.00 or more, about 4.25 or more, about 4.50 or more, about 4.75 or more, about 5.00 or more, about 5.25 or more, about 5.50 or more, about 5.75 or more, about 6.00 or more, or about 6.50 or more. Stable ferrous products may be in dry form, may be in liquid form, or may be in powder form. In some embodiments, a stable ferrous product may comprise ferrous in the form of ferrous sulfate. In some embodiments, a stable ferrous product may comprise ferrous in the form of ferrous chloride. In some instances, stable ferrous products may be produced by a method comprising the following steps: 1. providing a solution comprising ferrous; 2. neutralizing free acid if the solution is acidic); 3. reducing $Fe^{3+}$ to $Fe^{2+}$ (if ferric ions are present); 4. increasing the pH by adding a soda ash; 5. filtering the solution; 6. adding one or more citrate-based stabilizers to the solution; 7. adjusting the pH to final target; and 8. filtering the solution prior to storage and/or use if desired. In some embodiments, the source of ferrous for the stable ferrous products may be any one or more of the following: ferrous chloride, e.g., ferrous chloride tetrahydrate, ($FeCl_2*4\ H_2O$); ferrous sulfate, also known as copperas, e.g., ferrous sulfate heptahydrate ($FeSO_4*7\ H_2O$); and/or spent pickling liquors. In some embodiments, a stable ferrous product may comprise trisodium citrate. In some embodiments, a stable ferrous product may be stable for a prolonged duration, e.g., for 1 week or more, for 2 weeks or more, for 3 weeks or more, for 4 weeks or more, for 5 weeks or more, for 6 weeks or more, for 7 weeks or more, for 8 weeks or more, for 9 weeks or more, for 10 weeks or more, for 12 weeks or more, for 14 weeks or more, for 16 weeks or more, for 18 weeks or more, for 20 weeks or more, for 22 weeks or more, or for 24 weeks or more. For example, the stability of a stable ferrous product over time may be evidenced by the composition comprising ferrous and citrate constituents exhibiting little to no cloudiness and/or little to no precipitation evident to the human eye, after prolonged time, e.g., after storage at 0° C. for 1 week or more, for 2 weeks or more, for 3 weeks or more, for 4 weeks or more, for 5 weeks or more, for 6 weeks or more, for 7 weeks or more, for 8 weeks or more, for 9 weeks or more, for 10 weeks or more, for 12 weeks or more, for 14 weeks or more, for 16 weeks or more, for 18 weeks or more, for 20 weeks or more, for 22 weeks or more, or for 24 weeks or more. In some embodiments, a stable ferrous product may be stable at 20° C. for 1 week or more, for 2 weeks or more, for 3 weeks or more, for 4 weeks or more, for 5 weeks or more, for 6 weeks or more, for 7 weeks or more, for 8 weeks or more, for 9 weeks or more, for 10 weeks or more, for 12 weeks or more, for 14 weeks or more, for 16 weeks or more, for 18 weeks or more, for 20 weeks or more, for 22 weeks or more, or for 24 weeks or more. In some embodiments, a stable ferrous product may be stable, i.e., may demonstrate little to no cloudiness and/or little to no precipitation, at room temperature for 1 week or more, for 2 weeks or more, for 3 weeks or more, for 4 weeks or more, for 5 weeks or more, for 6 weeks or more, for 7 weeks or more, for 8 weeks or more, for 9 weeks or more, for 10 weeks or more, for 12 weeks or more, for 14 weeks or more, for 16 weeks or more, for 18 weeks or more, for 20 weeks or more, for 22 weeks or more, or for 24 weeks or more. In some embodiments, a stable ferrous product may be stable at 50° C. for 1 week or more, for 2 weeks or more, for 3 weeks or more, for 4 weeks or more, for 5 weeks or more, for 6 weeks or more, for 7 weeks or more, for 8 weeks or more, for 9 weeks or more, for 10 weeks or more, for 12 weeks or more, for 14 weeks or more, for 16 weeks or more, for 18 weeks or more, for 20 weeks or more, for 22 weeks or more, or for 24 weeks or more. In some embodiments, a stable ferrous product may comprise about 2% or less, about 2% or more, about 2.5% or more, about 3.0% or more, about 3.5% or more, about 4.0% or more, about 4.5% or more, about 5.0% or more, about 5.5% or more, about 6.0% or more, about 6.5% or more, about 7.0% or more, about 7.5% or more, about 8.0% or more, about 8.5% or more, about 9.0% or more, about 9.5% or more, about 10.0% or more, about 11.0% or more, about 12.0% or more, about 13.0% or more, about 14.0% or more, or about 15.0% or more Fe by weight. In some embodiments, a stable ferrous product may comprise about 0.10% or less, about 0.10% or more, about 0.20% or more, about 0.30% or more, about 0.40% or more, about 0.50% or more, about 0.75% or more, about 1.00% or more, about 1.25% or more, about 1.50% or more, about 1.75% or more, about 2.00% or more, about 2.25% or more, about 2.50% or more, about 2.75% or more, or about 3.00% or more of citrate-based stabilizer by weight. In some embodiments, a stable ferrous product may comprise from about 2% to about 15% Fe by weight, about 0.1% to about 3.0% citrate-based stabilizer by weight, and a pH value for from about 3.0 to about 6.0, e.g., from about 4.0 to about 6.0. In some embodiments, a stable ferrous product may comprise from about 2% to about 15% Fe by weight, wherein the Fe comprises Fe from ferrous sulfate, about 0.1% to about 3.0% citrate-based stabilizer by weight, and a pH value for from about 3.0 to about 6.0, e.g., from about 4.0 to about 6.0. In some embodiments, a stable ferrous product may comprise from about 2% to about 15% Fe by weight, wherein the Fe comprises Fe from ferrous chloride, about 0.1% to about 3.0% citrate-based stabilizer by weight, and a pH value for from about 3.0 to about 6.0, e.g., from about 4.0 to about 6.0. In some embodiments, one or more stable ferrous products may be used in one or more methods and/or comprised by one or more compositions for the treatment of fluids in need of treatment, e.g., those comprising contaminants such as heavy metals and/or sulfide, e.g., those comprising digesters. In some embodiments, one or more stable ferrous products may be used in one or more methods and/or comprised by one or more compositions for the treatment of gas streams in need of treatment. In some embodiments, a stable ferrous product may be non-corrosive, i.e., may be of such quality that said stable ferrous products are not considered corrosive by the United Nations test method, which method relies on if the mass loss on the metal specimen, e.g., steel, e.g., aluminum, in a corrosion test is more than 13.5% when the exposure time is 7 days to the product. In some instances, the stable ferrous product may be non-corrosive to steel and/or non-corrosive to aluminum. In some instances, the corrosion rate of said stable ferrous product is 6.25 or less, 6.0 or less, 5.5 or less, 5.0 or less, 4.5 or less, 4.0 or less, 3.5 or less, 3.0 or less, 2.5 or less, 2.0 or less, 1.5 or less, or 1.0 or less mm/year at 55° C. for steel and/or aluminum coupons.

As used herein, the term "sludge" generally refers to a mixture of liquid and solid components, which may be viscous or non-viscous, and which may comprise oil, water, and/or sediment. In some embodiments, produced water may comprise sludge. In some embodiments, produced water comprising sludge may result from enhanced oil recovery. In some embodiments, sludge may be formed following treatment of a fluid in need of treatment, e.g., treatment of wastewater. In some embodiments, a fluid in need of treatment may comprise sludge.

As used herein, the term "effluent" generally refers to treated or untreated wastewater that may be discharged from a treatment plant, sewer, or industrial outfall. Sometimes, effluent may refer to wastes discharged into surface waters. Effluent may generally refer to treated or untreated produced water, i.e., produced water resulting from one or more processes related to enhanced oil recovery. Effluent may generally refer to a fluid in need of treatment.

As used herein, the term "digester" generally refers to any micro-organism comprised by a fluid in need of treatment, which micro-organism is capable of digestion, e.g., anaerobic digestion, of materials comprised by said fluid in need of treatment, e.g., digestion of biowaste in sewer water. Such digesters may produce and/or effect an increase in the amount of sulfide, e.g., hydrogen sulfide, present in a fluid in need of treatment as a result of their digestion of contaminants contained therein.

Compositions and Methods

As discussed supra, current compositions and methods for treating fluids in need of treatment often comprise products of highly acidic or highly basic pHs. In some instances, the pH of such products may be less than 3.0. Oftentimes such acidic or basic products are times categorized as "hazardous products", and therefore require extra transportation and/or shipping costs. Furthermore, such products may require specialized equipment, such as double-wall tankage and piping systems, which also represent additional costs to users of such products. Moreover, it is known in the field that as the pH of such treatment products, such as conventional ferrous products, is increased to a pH of more than 3.0, precipitation of components, such as iron, often occurs, rendering the product ineffective. Therefore, treatment options comprising products of such pH and/or characteristics that are non-corrosive as well as products that help to decrease shipping costs are highly desired, in particular products of a pH greater than 3.0, e.g., from more than 3.00 to about 6.99, which products also do not suffer from precipitation of components, such as iron, when the pH is greater than 3.0.

As such, the present disclosure generally relates to coagulant composition suitable for the treatment of a fluid in need of treatment, wherein said coagulant composition comprises one or more coagulants, which one or more coagulants comprise at least one stable ferrous product, wherein said stable ferrous product comprises (i) one or more ferrous ($Fe^{2+}$) comprising compounds, (ii) one or more citrate-based stabilizers; and (iii) a pH value of from 3.00 to 6.99, wherein said one or more citrate-based stabilizers maintain the stability of said coagulant composition and/or prevents the oxidation of said ferrous compound in said coagulant composition. In some embodiments, the pH of the stable ferrous product may be about 3.0 or more, about 3.25 or more, about 3.50 or more, about 4.00 or more, about 4.25 or more, about 4.50 or more, about 4.75 or more, about 5.00 or more, about 5.25 or more, about 5.50 or more, about 5.75 or more, about 6.00 or more, or about 6.50 or more. In some embodiments, the stable ferrous product may be provided in dry form, may be provided in liquid form, and/or may be provided in powder form. In some embodiments, the stable ferrous product may comprise ferrous in the form of ferrous sulfate. In some embodiments, the stable ferrous product may comprise ferrous in the form of ferrous chloride. In some embodiments, said stable ferrous product may comprise a pH of from about 4.0 to about 6.0. In some embodiments, said stable ferrous product may comprise a pH of from about 4.0 to about 6.99, from about more than 4.5 to about 6.99, or from about 4.75 to about 6.99. In some embodiments, the stable ferrous product may comprise less than 5.0% by weight of said citrate-based stabilizer, optionally from about 0.10% to about 4.99% of said citrate-based stabilizer by weight, further optionally from about 0.10% to about 3.00% by weight of said citrate-based stabilizer. In some embodiments, the stable ferrous product may comprise more than 5.0% of Fe by weight. In some embodiments, said coagulant composition may comprise less than 30% by weight of hydrogen peroxide, optionally less than 25% by weight of hydrogen peroxide, further optionally less than 20, 10 or 5% by weight of hydrogen peroxide, and still further optionally does not comprise any appreciable or biocidally effective amount of hydrogen peroxide.

In some embodiments, one or more stable ferrous products may be produced by a method comprising the following steps: 1. providing a solution comprising ferrous; 2. neutralizing free acid if the solution is acidic solutions); 3. reducing $Fe^{3+}$ to $Fe^{2+}$ (if ferric ions are present); 4. increasing the pH by adding a soda ash; 5. filtering the solution; 6. adding one or more citrate-based stabilizers to the solution; 7. adjusting the pH to final target; and 8. filtering the solution prior to storage and/or use if desired.

In some embodiments, the source of ferrous for the one or more stable ferrous products may be any one or more of the following: ferrous chloride, e.g., ferrous chloride tetrahydrate, ($FeCl_2 * 4\ H_2O$); ferrous sulfate, also known as copperas, e.g., ferrous sulfate heptahydrate ($FeSO_4 * 7\ H_2O$); and/or spent pickling liquors.

In some embodiments, a stable ferrous product may comprise a citrate-based stabilizer comprising trisodium citrate. In some embodiments, a stable ferrous product may comprise a citrate-based stabilizer comprising sodium citrate. In some embodiments, a stable ferrous product may comprise a citrate-based stabilizer comprising citric acid, wherein optionally the pH may be adjusted to compensate for $H^+$ which may result from the addition of citric acid. In some embodiments, a stable ferrous product may be stable at 0° C. for 1 week or more, for 2 weeks or more, for 3 weeks or more, for 4 weeks or more, for 5 weeks or more, for 6 weeks or more, for 7 weeks or more, for 8 weeks or more, for 9 weeks or more, for 10 weeks or more, for 12 weeks or more, for 14 weeks or more, for 16 weeks or more, for 18 weeks or more, for 20 weeks or more, for 22 weeks or more, or for 24 weeks or more. In some embodiments, a stable ferrous product may be stable at 20° C. for 1 week or more, for 2 weeks or more, for 3 weeks or more, for 4 weeks or more, for 5 weeks or more, for 6 weeks or more, for 7 weeks or more, for 8 weeks or more, for 9 weeks or more, for 10 weeks or more, for 12 weeks or more, for 14 weeks or more, for 16 weeks or more, for 18 weeks or more, for 20 weeks or more, for 22 weeks or more, or for 24 weeks or more. In some embodiments, a stable ferrous product may be stable, i.e., may demonstrate little to no cloudiness and/or little to no precipitation, at room temperature for 1 week or more, for 2 weeks or more, for 3 weeks or more, for 4 weeks or more, for 5 weeks or more, for 6 weeks or more, for 7 weeks or more, for 8 weeks or more, for 9 weeks or more, for 10 weeks or more, for 12 weeks or more, for 14 weeks or more, for 16 weeks or more, for 18 weeks or more, for 20 weeks or more, for 22 weeks or more, or for 24 weeks or more. In some embodiments, a stable ferrous product may be stable at 50° C. for 1 week or more, for 2 weeks or more, for 3 weeks or more, for 4 weeks or more, for 5 weeks or more, for 6 weeks or more, for 7 weeks or more, for 8 weeks or more, for 9 weeks or more, for 10 weeks or more, for 12 weeks or more, for 14 weeks or more, for 16 weeks or more, for 18 weeks or more, for 20 weeks or more, for 22 weeks or more, or for 24 weeks or more.

It was observed that the source of the ferrous in the one or more stable ferrous products, e.g., ferrous from copperas, e.g., ferrous from SPL, had some degree of effect on stability. In the case of ferrous from SPL, not wishing to be bound by theory, it was postulated that the stability of stable ferrous products comprising ferrous from SPL can be explained by the quality difference in SPL as compared to, for example, copperas, as the SPL generally comprises various additives and heavy metal content, whereas other sources of ferrous, e.g., ferrous chloride hydrate, e.g., ferrous sulfate tetrahydrate, may not comprise such additives and/or heavy metal content.

In some embodiments, the stable ferrous product may comprise about 2% or less, about 2% or more, about 2.5% or more, about 3.0% or more, about 3.5% or more, about 4.0% or more, about 4.5% or more, about 5.0% or more, about 5.5% or more, about 6.0% or more, about 6.5% or more, about 7.0% or more, about 7.5% or more, about 8.0% or more, about 8.5% or more, about 9.0% or more, about 9.5% or more, about 10.0% or more, about 11.0% or more, about 12.0% or more, about 13.0% or more, about 14.0% or more, or about 15.0% or more Fe. In some embodiments, the stable ferrous product may comprise about 0.10% or less, about 0.10% or more, about 0.20% or more, about 0.30% or more, about 0.40% or more, about 0.50% or more, about 0.75% or more, about 1.00% or more, about 1.25% or more, about 1.50% or more, about 1.75% or more, about 2.00% or more, about 2.25% or more, about 2.50% or more, about 2.75% or more, or about 3.00% or more of citrate-based stabilizer by weight.

In some embodiments, the stable ferrous product may be non-corrosive, i.e., may be of such quality that said stable ferrous products are not considered corrosive by the United Nations test method, which method relies on if the mass loss on the metal specimen in a corrosion test is more than 13.5% when the exposure time is 7 days to the product. In some instances, the stable ferrous product may be non-corrosive to steel and/or non-corrosive to aluminum. In some instances, the corrosion rate of said stable ferrous product is 6.25 or less, 6.0 or less, 5.5 or less, 5.0 or less, 4.5 or less, 4.0 or less, 3.5 or less, 3.0 or less, 2.5 or less, 2.0 or less, 1.5 or less, or 1.0 or less mm/year at 55° C. in steel and/or aluminum coupons.

In some embodiments, the stable ferrous product may comprise from about 2% to about 15% Fe by weight, about 0.1% to about 3.0% citrate-based stabilizer by weight, and a pH value for from about 3.0 to about 6.0. In some embodiments, the stable ferrous product may comprise from about 2% to about 15% Fe by weight, wherein the Fe comprises Fe from ferrous sulfate, about 0.1% to about 3.0% citrate-based stabilizer by weight, and a pH value for from about 3.0 to about 6.0. In some embodiments, the stable ferrous product may comprise from about 2% to about 15% Fe by weight, wherein the Fe comprises Fe from ferrous chloride, about 0.1% to about 3.0% citrate-based stabilizer by weight, and a pH value for from about 3.0 to about 6.0. In some embodiments, the stable ferrous product may be used in one or more methods and/or comprised by one or more compositions for the treatment of fluids in need of treatment, e.g., those comprising contaminants such as heavy metals and/or sulfide and/or digesters.

Moreover, the present disclosure generally relates to a method for treating a fluid in need of treatment, wherein said method comprises: a. providing a fluid in need of treatment; b. adding to said fluid in need of treatment at least one coagulant composition which comprises one or more stable ferrous products in an amount effective to treat said fluid in need of treatment; and c. mixing the fluid in need of treatment and the one or more stable ferrous products to effect treatment of said fluid; wherein the one or more stable ferrous products comprise (i) one or more ferrous ($Fe^{2+}$) comprising compounds, (ii) one or more citrate-based stabilizers; and (iii) a pH value of from 3.00 to 6.99. In some embodiments, said fluid in need of treatment may comprise sulfide, optionally at least 1 mg/kg sulfide concentration, further optionally at least 5 mg/kg sulfide concentration. In some embodiments, treatment of said fluid with said one or more stable ferrous products may result in 75% or less, 75% or more, 80% or more, 85% or more, 90% or more, 95% or more, 99% or more, or 100% removal of sulfide from said fluid in need of treatment. In some embodiments, the one or more stable ferrous products may comprise less than 5.0% by weight of citrate-based stabilizer, optionally from about 0.10% to about 4.99% by weight of citrate-based stabilizer, further optionally from about 0.10% to about 3.00% by weight of citrate-based stabilizer. In some embodiments, the one or more stable ferrous products may comprise more than 5.0% of Fe by weight. In some embodiments, said coagulant composition may comprise less than 30% by weight of hydrogen peroxide, optionally less than 25% by weight of hydrogen peroxide, further optionally less than 20, 10 or 5% by weight hydrogen peroxide, still further optionally being devoid of any appreciable or biocidally effective amount of hydrogen peroxide. In some embodiments, said fluid in need of treatment may comprise sulfide, optionally at least 1 mg/kg sulfide concentration, further optionally at least 5 mg/kg sulfide concentration. In some embodiments, said fluid in need of treatment may comprise fluid used in, or in conjunction with, or as a part of a process of, any one or more of the following: sewer networks; pumping stations; wastewater treatment plants, deep and shallow wells, poorly constructed wells close to sewer lines, surface water that is close to a septic system; industrial effluent; static contaminated water; and/or wastewater comprising digesters, e.g., microorganisms for effecting anaerobic digestion, e.g., those that may be added at wastewater treatment plants. In some embodiments, said method may comprise adding an amount of one or more stable ferrous products to said fluid in need of treatment that is effective to remove one or more contaminants from said fluid in need of treatment. For example, in some instances, a fluid in need of treatment may comprise sulfide, e.g., in the form of hydrogen sulfide, and the amount of the one or more stable ferrous products added may be an amount in excess of the hydrogen sulfide comprised by said fluid, wherein such hydrogen sulfide amount may be measured prior to addition of said one or more stable ferrous products. In some embodiments, said one or more stable ferrous products may be added to a fluid in need of treatment at about 5% by weight Fe of a stable ferrous product, e.g., a stable ferrous product comprising ferrous sulfate, and/or about 10% Fe by weight of a stable ferrous product, e.g., a stable ferrous product comprising ferrous chloride. In some embodiments, said one or more stable ferrous products may be added to a fluid in need of treatment at about 1% or less, 1% or more, 2% or more, 3% or more, 4% or more, 5% or more, 6% or more, 7% or more, 8% or more, 9% or more, 10% or more, 12% or more, 14% or more, 16% or more, 18% or more, or 20% or more by weight Fe of a stable ferrous product. In some embodiments, treatment of said fluids in need of treatment with said one or more ferrous products may comprise a delayed onset of the effected treatment, i.e., delayed onset of treatment following addition of one or more stable ferrous products, which delayed onset may be advantageous for fluids in need of treatment such as sewage water and/or waters comprised by sewer networks. Not wishing to be bound by theory, it is postulated that the chelating effects of the citrate-based stabilizer on iron may result in the aforementioned delayed onset of the effected treatment.

Moreover, the present disclosure generally relates to a method of treating a gas stream in need of treatment, e.g., any gaseous stream which may comprise contaminants, such as hydrogen sulfide gas. In some embodiments, said gas streams in need of treatment include, but are not limited to, any one or more of the following: air, natural gas, $CO_2$, amine acid gas, biogas, landfill gas, refinery fuel gas, and the like. In some embodiments, said method may comprise adding an amount of one or more stable ferrous products to said gas stream in need of treatment that is effective to remove one or more contaminants from said gas stream in need of treatment. In some embodiments, the dosage of one or more stable ferrous products may be an amount that is determined at least in part by the volume and/or the concentration of the one or more gases comprised by a gas stream. In some instances, a gas stream in need of treatment may be treated by using an absorption column and a solution comprising one or more stable ferrous products, wherein the amount and/or concentration of iron solution used is based at least in part on the volume and/or concentration of one or more gases comprised by the gas stream in need of treatment.

In some embodiments, said method may further include the addition of at least one biocide, e.g., one that kills or inhibits the proliferation of sulfate-reducing bacteria. In some instances, the combined usage of said at least one biocide and said one or more stable ferrous products may have an additive or synergistic effect on the reduction, inhibition or stabilization of the formation of, or the amount of sulfide in the treated fluid. In some embodiments, said at least one biocide may comprise at least one oxidizing biocide. In some embodiments, said oxidizing biocide may be any one or more of the following: an oxidant selected from chlorine, alkali and alkaline earth hypochlorite salts, hypochlorous acid, chlorinated isocyanurates, bromine, alkali and alkaline earth hypobromite salts, hypobromous acid, bromine chloride, chlorine dioxide, ozone, hydrogen peroxide, peroxy compounds, such as peracetic acid, performic acid, percarbonate or persulfate salts, halogenated hydantoins, e.g., monohalodimethylhydantoins such as monochlorodimethylhydantoin, or dihalodimethylhydantoins such as chlorobromodimethylhydantoin, monochloramines, monobromamines, dihaloamines, trihaloamines, or a combination thereof; optionally combined with substituted an N-hydrogen compound, such as ammonium salts, ammonia, urea, hydantoin, isothiazoline-1,1-dioxide, ethanolamine, pyrrolidone, 2-pyrrolidone, ethylene urea, N-methylolurea, N-methylurea, acetylurea, pyrrole, indole, formamide, benzamide, acetamide, imidazoline, or morpholine; and monochloramine (MCA), chlorine dioxide, performic acid (PFA), peracetic acid, alkali and alkaline earth hypochlorite salts, and N-hydrogen compounds combined with an oxidant. In some embodiments, said at least one biocide may comprise at least one non-oxidizing biocide. In some embodiments, said non-oxidizing biocide may be any one or more of the following: glutaraldehyde, 2,2-dibromo-3-nitrilopropionamide (DBNPA), 2-bromo-2-nitropropane-1,3-diol (Bronopol), quaternary ammonium compounds, carbamates, 5-chloro-2-methyl-4-isothiazolin-3-one (CMIT), 2-methyl-4-isothiazolin-3-one (MIT), 1,2-dibromo-2,4-dicyanobutane, bis(trichloromethyl)sulfone, 2-bromo-2-nitrostyrene, 4,5-dichloro-1,2-dithiol-3-one, 2-n-octyl-4-isothiazolin-3-one, 1,2-benzisothiazolin-3-one, orthophthaldehyde, quaternary ammonium compounds (="quats"), such as n-alkyl dimethyl benzyl ammonium chloride, didecyl dimethyl ammonium chloride (DDAC) or alkenyl dimethylethyl ammonium chloride, guanidines, biguanidines, pyrithiones, 3-iodopropynyl-N-butylcarbamate, phosphonium salts, such as tetrakis hydroxymethyl phosphonium sulfate (THPS), dazomet, 2-(thiocyanomethylthio) benzothiazole, methylene bisthiocyanate (MBT), and a combination thereof.

Furthermore, the present disclosure generally relates to a method of producing a stable ferrous product, wherein said method comprises: a. providing a solution comprising ferrous; b. neutralizing free acid if the solution is acidic); c. reducing $Fe^{3+}$ to $Fe^{2+}$ (if ferric ions are present, e.g., from spent pickling liquor as a source of ferrous); d. increasing the pH by adding a soda ash; e. filtering the solution; f adding one or more citrate-based stabilizers to the solution; g. adjusting the pH to final target; and, optionally h. filtering the solution prior to storage and/or use.

Moreover, the present disclosure generally relates to a composition comprising a fluid in need of treatment and one or more stable ferrous products, wherein said one or more stable ferrous products comprise from about 2% to about 15% Fe by weight, about 0.1% to about 3.0% citrate by weight, and a pH value for from about 3.0 to about 6.0. The present disclosure also generally encompasses a composition comprising a fluid in need of treatment and one or more stable ferrous products, wherein said fluid in need of treatment comprises sulfide, optionally at least 1 mg/kg sulfide concentration, further optionally at least 5 mg/kg sulfide concentration; and said one or more stable ferrous products comprise from about 2% to about 15% Fe by weight, about 0.1% to about 3.0% citrate by weight, and a pH value for from about 3.0 to about 6.0.

Furthermore, the present disclosure generally relates to a coagulant composition suitable for the treatment of a fluid in need of treatment, wherein said coagulant composition comprises one or more stable ferrous products, wherein said stable ferrous products comprise (i) one or more ferrous ($Fe^{2+}$) comprising compounds, optionally wherein the one or more stable ferrous products comprise more than 5.0% of Fe by weight; (ii) one or more citrate-based stabilizers, optionally wherein the one or more stable ferrous products comprise less than 5.0% by weight citrate-based stabilizer, further optionally from about 0.10% to about 4.99% of citrate-based stabilizer by weight, further optionally from about 0.10% to about 3.00%; (iii) a pH value of from 3.00 to 6.99, optionally from about 3.0 to about 6.0; wherein said one or more citrate-based stabilizers maintains the stability of said composition and/or prevents the oxidation of said ferrous compound in said composition, further wherein said composition comprises less than 30% by weight hydrogen peroxide, optionally less than 25% by weight hydrogen peroxide, further optionally less than 20% by weight hydrogen peroxide.

The compositions and methods illustratively disclosed herein suitably may be practiced in the absence of any element which is not specifically disclosed herein and/or any element specifically disclosed herein.

EXAMPLES

Example 1: Production of Stable Ferrous Products

In this example, various different stable ferrous products were produced according to the methods described below.

The source of ferrous for the stable ferrous products was: ferrous chloride from ferrous chloride tetrahydrate (lab grade, Sigma-Aldrich ($FeCl_2*4\ H_2O$); ferrous sulfate from copperas or ferrous sulfate heptahydrate ($FeSO_4*7\ H_2O$) (Kemira); or ferrous chloride from spent pickling liquors from various different a steel producers (SSAB, Sweden o Mecalux, Spain o Gonvari, Spain or Gesitma). In instances where iron powder was added during the production of a stable ferrous product, the iron metal source was either mill scale (FeO, $Fe_2O_3$, Fe(s); iron powder (Fe(s)); or iron chips (Fe(s)). In the present examples, soda ash, which was used in order to increase the pH of the ferrous solutions, was sodium carbonate ($Na_2CO_3$) (lab grade from Merck). One or more stabilizers were included in various stable ferrous products discussed in the examples and are further discussed below. It is noted that spent pickling liquor from sulfuric acid can also be used as a source of ferrous.

The following citrate-based stabilizer and other potential stabilizers were used in preparation of stable ferrous products: trisodium citrate, (ACS grade—Alfa Aesar); sodium gluconate (ACS grade—ACROS); ascorbic acid (ACS grade—VWR); and tartaric acid (ACS grade—Sigma Aldrich).

In general, the procedure for manufacturing a stable ferrous product was as follows: 1. Preparing the ferrous solution; 2. Neutralizing free acid (if ferrous solution is more acidic than desired); 3. Reducing $Fe^{3+}$ to $Fe^{2+}$ if ferric ions are present; 4. Increasing the pH by adding a soda ash; 5. Filtering; 6. Adding one or more stabilizers; 7. Adjusting the pH to the final desired target value; and 8. Filtering (if desired).

Stable ferrous products comprising ferrous from $FeSO_4$ (such as from copperas) were prepared as follows. Liquid ferrous sulfate (Fe=5-7% by weight) was made at pH 3 by dissolving solid copperas ($FeSO_4*7H_2O$) in tap water. Next, Fe powder was added to the reaction mixture. This mixture was then stirred for 1 hour. Subsequently, the pH was increased to a desired value in ferrous solutions by adding solid sodium carbonate ($Na_2CO_3$) (soda ash) (addition of $Na_2CO_3$ in solution form and NaOH in solution form, were also tested in this step, and the same results were obtained as by dry addition of soda ash). The mixture was then stirred for two hours. Following the pH increase and stirring of the mixture, the mixture was filtered using 2 μm paper filter. Next, ferrous solutions were stabilized by addition of stabilizer at a desired concentration, as described further below. Finally, the pH was adjusted to the desired pH value at ambient temperature by addition of $Na_2CO_3$. Before each of the stability tests, corrosion tests, and wastewater treatment tests described throughout the working examples, each of the samples of a given stable ferrous product was filtered again. Solutions were stored at either 0° C., 20° C., room temperature, or 50° C. for determining the stability of the various different stable ferrous products, as further described below.

Stable ferrous products comprising ferrous from solid $FeCl_2$ were prepared as follows. First, liquid ferrous chloride (Fe=10-12% by weight) was made at pH 1 by dissolving solid ferrous chloride tetrahydrate ($FeCl_2*4H_2O$) in tap water. Next, Fe powder was added to the mixture, during which addition the pH increased to about 2-3 (depending on the mixing time). Following mixing, the pH was increased a desired value in ferrous solutions by adding solid sodium carbonate ($Na_2CO_3$). Following the pH increase and stirring of the mixture, the mixture was filtered using 2 μm paper filter. Next, the solutions were stabilized by addition of stabilizer at a desired concentration, as described further below. Finally, the pH was adjusted to the desired value at ambient temperature. Before each of the stability tests, corrosion tests, and wastewater treatment tests described throughout the working examples, each of the samples was filtered again. Solutions were stored at either 0° C., 20° C., room temperature, or 50° C. for determining the stability of the various different stable ferrous products, as further described below.

Stable ferrous products comprising ferrous from $FeCl_2$ from spent pickling liquor (SPL) were prepared as follows. First, spent pickling liquor (Fe=10-12% by weight) was neutralized by addition of mill scale for about 2 hours. Next, Fe powder was added to reduce the ferric ions for about 1 hour. Furthermore, the iron powder neutralized the free acid and increased the pH to about 3. Following addition of Fe powder and mixing, the pH was increased a desired value in ferrous solutions by adding solid sodium carbonate ($Na_2CO_3$). Following the pH increase and stirring of the mixture, the mixture was filtered using 2 μm paper filter. Next, ferrous solutions were stabilized by addition of stabilizer at a desired concentration, as described further below. Finally, the pH was adjusted to the desired value at ambient temperature. Before each of the stability tests, corrosion tests, and wastewater treatment tests described throughout the working examples, each of the samples was filtered again. Solutions were stored at either 0° C., 20° C., room temperature, or 50° C. for determining the stability of the various different stable ferrous products, as further described below.

Example 2: Stability Tests of Stable Ferrous Products

In this example, the stability of various stable ferrous products prepared as generally described in Example 1 underwent stability tests to evaluate their stability over time at 0° C., 20° C., and 50° C. The source of the ferrous, the amount of Fe, the pH, and the concentration of the stabilizer were varied in the different ferrous samples that were produced, and the effects of these variables on the stability of said products evaluated. The stability of the samples was again evaluated visually. For comparison, a sample comprising ferrous chloride and no stabilizer was stored for 1 day at pH 4 (see FIG. 1). As presented in FIG. 1, red precipitates formed (see, for example, the bottom of the bottle and the surface of the liquid) (FIG. 1). Furthermore, it was noted visually that solutions comprising either ferrous chloride at pH 4 or ferrous sulfate at pH 5, which solutions did not comprise a stabilizer, were stable for only a few hours.

Following preparation of each of the different stable ferrous products which were evaluated in the present example, 25 mL of each stable ferrous product was placed in a separate test tube and stored at either 0° C., 20° C., and 50° C., and the stability over time was evaluated visually. The stability results obtained for each of the stable ferrous products comprising ferrous from $FeSO_4$ based on copperas are presented in Table 1 below. The stability results obtained for each of the stable ferrous products comprising ferrous from solid ferrous chloride tetrahydrate (lab grade solid ferrous chloride tetrahydrate) are presented in Table 2 below. The stability results obtained for each of the stable ferrous products comprising ferrous from $FeCl_2$ from SPL are presented in Table 8 below.

TABLE 1

STABILITY OF STABLE FERROUS PRODUCTS COMPRISING $FESO_4$ FROM COPPERAS

| Fe % | pH  | Stabilizer     | Stabilizer % | 0° C.     | 20° C.    | 50° C.    |
|------|-----|----------------|--------------|-----------|-----------|-----------|
| 5    | 4.7 | Sodium citrate | 2            | 24 weeks  | 24 weeks  | 24 weeks  |
| 5    | 4.8 | Sodium citrate | 1.5          | 24 weeks  | 24 weeks  | 24 weeks  |
| 6    | 5.3 | Sodium citrate | 2            | 24 weeks  | 24 weeks  | 24 weeks  |
| 6    | 5.5 | Sodium citrate | 1.5          | 3 weeks   | 24 weeks  | 10 weeks  |
| 5    | 5.4 | Sodium citrate | 0.5          | 11 weeks  | 6 weeks   | 6 weeks   |
| 5    | 5   | Sodium citrate | 1            | 12 weeks  | 3 weeks   | 10 weeks  |
| 6.25 | 5.8 | Sodium citrate | 0.25         | 1 day     | 1 day     | 1 day     |
| 6.1  | 5.7 | Sodium citrate | 0.5          | 1 day     | 1 day     | 1 day     |
| 6    | 5.8 | Sodium citrate | 1            | 1 day     | 1 weeks   | 1 day     |
| 7    | 5   | Sodium citrate | 1.5          | 2 weeks   | 2 weeks   | 2 weeks   |
| 7    | 5   | Sodium citrate | 2            | 4 weeks   | 12 weeks  | 10 weeks  |

Note:
The stability test was stopped after 24 weeks

TABLE 2

STABILITY OF STABLE FERROUS PRODUCTS COMPRISING $FECL_2$ FROM SOLID FERROUS CHLORIDE TETRAHYDRATE

| Fe   | pH  | Stabilizer     | Stabilizer % | 0 C.      | 20 C.     | 50 C.     |
|------|-----|----------------|--------------|-----------|-----------|-----------|
| 10   | 4.2 | Sodium citrate | 0.5          | 16 weeks  | 8 weeks   | 6 weeks   |
| 10   | 4.2 | Sodium citrate | 1            | 16 weeks  | 8 weeks   | 6 weeks   |
| 10   | 4   | Sodium citrate | 1.5          | 17 weeks  | 17 weeks  | 6 weeks   |
| 9.7  | 4.3 | Sodium citrate | 1            | 12 weeks  | 9 weeks   | 7 weeks   |
| 9.7  | 4.4 | Sodium citrate | 2            | 14 weeks  | 13 weeks  | 1 week    |

TABLE 2-continued

STABILITY OF STABLE FERROUS PRODUCTS COMPRISING
$FECL_2$ FROM SOLID FERROUS CHLORIDE TETRAHYDRATE

| Fe | pH | Stabilizer | Stabilizer % | 0 C. | 20 C. | 50 C. |
|---|---|---|---|---|---|---|
| 9.7 | 4.3 | Sodium citrate | 3 | 17 weeks | 17 weeks | 7 weeks |
| 9.7 | 4.5 | Sodium citrate | 4 | 17 weeks | 17 weeks | 7 weeks |
| 9.4 | 4.9 | Sodium citrate | 1 | 9 weeks | 1 weeks | 1 week |
| 9.4 | 4.8 | Sodium citrate | 1.5 | 11 weeks | 3 weeks | 1 weeks |
| 9.4 | 4.5 | Sodium citrate | 2 | 11 weeks | 24 weeks | 2 weeks |
| 9.4 | 4.4 | Sodium citrate | 2.5 | 24 weeks | 24 weeks | 2 weeks |
| 8.2 | 4.5 | Sodium citrate | 2 | 24 weeks | 24 weeks | 4 weeks |
| 8.2 | 4 | Sodium citrate | 2.5 | 24 weeks | 24 weeks | 6 weeks |
| 6.8 | 4.4 | Sodium citrate | 1 | 24 weeks | 10 weeks | 9 weeks |
| 6.8 | 4.8 | Sodium citrate | 1.5 | 24 weeks | 24 weeks | 1 week |
| 6.8 | 4.4 | Sodium citrate | 2 | 24 weeks | 24 weeks | 6 weeks |

Note:
The stability test stopped after 24 weeks

As presented in Table 1 above, various different ferrous products demonstrated a high degree of stability. For example, various different stable ferrous products were stable for 24 weeks, at which point these samples as they had no appearance of instability (see Table 6). The stability tests were stopped after 24 weeks.

Figure 2:
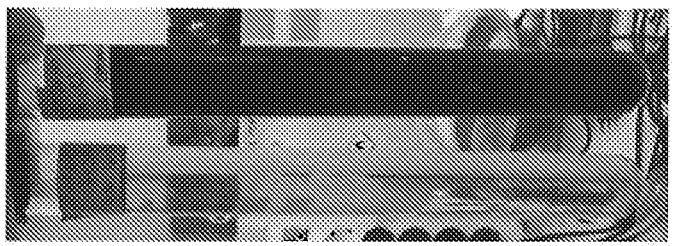
FIG. 2 presents an image of test tubes containing compositions comprising a ferrous product in accordance with Example 2. The test tube on the left contained a composition comprising ferrous sulfate, and the test tube on the right contained a composition comprising ferrous chloride.
Figure 3:
FIG. 3 presents an image of bottles containing compositions comprising a ferrous product in accordance with Example 2. Both of the bottles in the image contained a composition comprising ferrous chloride. The bottle on the left was not purged with $N_2$ prior to storage, and the bottle on the right was purged with $N_2$ prior to storage.

As presented in Table 2 above, various different ferrous products demonstrated a high degree of stability. For example, various different stable ferrous products were stable for 24 weeks, at which point these samples as they had no appearance of instability (see Table 7). The stability tests were stopped after 24 weeks During the stability tests, which were performed in test tubes, it was noted that the surface area above the sample in the test tube was very small compared to total volume in the tube (see FIG. 2), which appeared to result in a low surface oxidation rate. It was observed that the stability decreased when the samples were stored in larger volume bottles (0.5-1 liter) where there was high surface between the liquid and air (see FIG. 3). These results indicate the importance of air oxidation at the surface of the solution and its relation to stability. It was also observed that when nitrogen gas was used to purge the air from the bottle, the stability of the sample was increased (see FIG. 3: the bottle to the left was purged with $N_2$ which leads to more stability).

For further comparison, compositions comprising ferrous from either ferrous sulfate or ferrous chloride were prepared with various different potential stabilizers other than a citrate-based stabilizer by the procedure generally described in Example 1 (see Table 3). Stability tests were performed at 20° C., and the results that were obtained are presented in Table 3.

TABLE 3

STABILITY OF FERROUS PRODUCTS WITH
DIFFERENT POTENTIAL STABILIZERS

| Fe % (weight) | Ferrous Source | pH | Potential Stabilizer | Potential Stabilizer % (weight) | Comment(s) |
|---|---|---|---|---|---|
| 11 | $FeCl_2$ | 4 | Sodium gluconate | 1 | Stable for 3 weeks but pH dropped to 2.0 |
| 6 | $FeSO_4$ | 6 | Sodium gluconate | 0.5 | Stable for 3 weeks but pH dropped to 3.0 |
| 5.5 | $FeSO_4$ | 5.0 | Ascorbic acid | 0.1 | Stable for 3 weeks but pH dropped to 2.7 |
| 5.7 | $FeSO_4$ | 5.7 | Tartaric acid | 0.1 | Stable for 3 weeks but pH dropped to 2.5 |

As demonstrated by the results of Table 3 above, the other potential stabilizers tested did not produce desired results. For example, each of the compositions tested was only stable for 3 weeks, and the tests were stopped after 3 weeks as each of the compositions was no longer stable. Furthermore, the pH of each of the compositions was a value of less than or equal to 3.0.

Example 3: Wastewater Treatment Tests of Stable Ferrous Products

In the present example, exemplary stable ferrous products according to the invention were used to treat wastewater. These stable ferrous products were prepared as generally described in Example 1. The performance of said stable ferrous products was evaluated in a real wastewater matrix which comprised sulfide. The sulfide-containing wastewater matrix was prepared by dissolving $Na_2S$ in incoming and outgoing wastewater from a wastewater treatment plant (Suomenoja WWTP in Finland). For comparison, iron-based coagulants comprising either $FeCl_3$ or $Fe_2(SO_4)_3$ were used in the tests described below.

The tests were carried out by adding stable ferrous products or iron-based coagulants to the sulfide-containing wastewater. More specifically, 100-500 mL of the sulfide wastewater was used for each experiment, into which either a stable ferrous product or an iron-based coagulant was mixed for 5-25 minutes at ambient temperature. The mixture was then filtered by a syringe filter with an 0.45 μM GHP membrane (hydrophilic polypropylene).

The concentration of residual S and Fe in filtrate were analyzed by inductively coupled plasma optical emission spectrometry (ICP-OES), and the concentration of $SO_4$ was analyzed by ion chromatography (IC).

In the present example, a stable ferrous product comprising ferrous sulfate comprising Fe=5%, pH=4.8 and sodium citrate=1.5%), and a stable ferrous product comprising ferrous chloride comprising Fe=10%, pH=4, sodium citrate=2% were tested.

For the present example, sulfide removal from wastewater samples treated with either a stable ferrous product or an iron-based coagulant was calculated according to the following equation: Sulfide removal=(initial sulfur in feed−residual S+residual S as $SO_4$)/initial sulfur in feed*100. It is noted that the following assumptions were made for calculation of the sulfide removal: All the sulfur in the filtrate was in form of sulfide or sulfate, and no other sulfide species were present.

The results of the wastewater treatment tests described above are presented in Tables 4-7, below.

TABLE 4

WASTEWATER TREATMENT TEST

| Product | Dosage Fe/S (mol/mol) | Mixing time, minutes | pH after treatment | Residual S mg/kg | Residual Fe mg/kg | Residual S as $SO_4$ mg/kg | Sulfide Removal % |
|---|---|---|---|---|---|---|---|
| Iron-based Coagulant A | 1 | 5 | 6.6 | 9 | 36 | 0 | 82 |
| Stable Ferrous Product (ferrous from $FeCl_2$) | 1 | 23 | 8 | 7.5 | 1 | 1.5 | 88 |
| Stable Ferrous Product (ferrous from $FeSO_4$) | 1 | 15 | 7.5 | 63 | 2 | 56 | 86 |

Sulfide dissolved in outgoing wastewater, $S_{feed}$ = 50 mg/kg, $pH_{feed}$ = 10.9

TABLE 5

WASTEWATER TREATMENT TEST

| Product | Dosage Fe/S (mol/mol) | Mixing time, minutes | pH after treatment | Residual S mg/kg | Residual Fe mg/kg | Residual S as $SO_4$ mg/kg | Sulfide Removal % |
|---|---|---|---|---|---|---|---|
| Iron-based Coagulant A | 1 | 15 | 3 | — | — | — | No reaction |
| Stable Ferrous Product (ferrous from $FeCl_2$) | 1 | 15 | 5.2 | 9 | 32 | 0 | 88 |
| Stable Ferrous Product (ferrous from $FeSO_4$) | 1 | 15 | 6 | 63 | 63 | 60 | 86 |

Sulfide dissolved in outgoing wastewater, $S_{feed}$ = 50 mg/kg, pH was adjusted in feed to $pH_{feed}$ = 7 (pH adjustment by adding HCl)

TABLE 6

WASTEWATER TREATMENT TEST

| Product | Dosage Fe/S (mol/mol) | Mixing time, min | pH after treatment | Residual S mg/kg | Residual Fe mg/kg | Residual S as $SO_4$ mg/kg | Sulfide Removal % |
|---|---|---|---|---|---|---|---|
| Iron-based Coagulant A | 1 | 15 | 6.5 | 0 | 2.5 | 0 | 100 |
| Stable Ferrous Product (ferrous from $FeCl_2$) | 1 | 15 | 6.9 | 0 | 1.5 | 0 | 100 |
| Stable Ferrous Product (ferrous from $FeSO_4$) | 1 | 15 | 7.1 | 60 | 1.5 | 60 | 100 |

Sulfide dissolved in outgoing wastewater, $S_{feed}$ = 5 mg/kg, $pH_{feed}$ = 9.9

TABLE 7

WASTEWATER TREATMENT TEST

| Product | pH after treatment | Residual S mg/kg | Residual Fe mg/kg | Residual S as $SO_4$ mg/kg | Residual TOC mg/kg | Residual P mg/kg | Sulfide Removal % |
|---|---|---|---|---|---|---|---|
| Iron-based Coagulant A | 6.9 | 18 | 0 | 0 | 94 | 0 | 44.1 |
| Stable Ferrous Product (ferrous from $FeCl_2$) | 7.8 | 15 | 7 | 0 | 100 | 0 | 53.1 |
| Iron-based Coagulant B | 6.8 | 63 | 9 | 47 | 92 | 0 | 49.3 |
| Stable Ferrous Product (ferrous from $FeSO_4$) | 7.8 | 48 | 3 | 37 | 100 | 0 | 64.8 |

Sulfide dissolved in incoming wastewater, $S_{feed}$ = 32 mg/kg, TOC = 120 mg/kg, P = 5 mg/kg, and $pH_{feed}$ = 8.4. Mixing time = 15 minutes; Fe/S = 1.2 mol/mol.

As presented in Tables 4-7 above, the results demonstrated that the stable ferrous products removed sulfide from wastewater matrix more efficiently than the iron-based coagulants (A or B). The results further demonstrated that pH after treatment was higher when the stable ferrous products were used as compared to the iron-based coagulants.

Example 4: Corrosion Tests of Stable Ferrous Products

In the present example, the corrosion rates of various different stable ferrous products were measured. It is noted that a liquid is classified as corrosive according to United Nation (UN) transportation regulation if metal specimens (coupons), such as steel or aluminum, are corroded at a rate grater of 6.25 mm/year at 55° C. Furthermore, according to the UN test method, the test is considered positive if, for any metal specimen, the mass loss of the metal specimen is more than 13.5% when the exposure time is 7 days.

The following stable ferrous products were used in corrosion test 1 of the present example: stable ferrous product comprising ferrous from $FeSO_4$ (copperas): Fe=5.25%, pH=5, and Na-citrate=1.5%; stable ferrous product comprising ferrous from $FeCl_2$ (mixed SPL): Fe=11%, pH=4, and Na-citrate=2%; stable ferrous product comprising ferrous from $FeCl_2$ ($FeCl_2$*4 $H_2O$): Fe=9.6%, pH=4, and Na-citrate=2%.

The following stable ferrous products were used in corrosion test 2 of the present example: stable ferrous product comprising ferrous from $FeSO_4$ (copperas): Fe=5%, pH=4, and Na-citrate=1.5%; stable ferrous product comprising ferrous from $FeCl_2$ (SPL): Fe=10%, pH=3.5, and Na-citrate=2%.

The results from corrosion test 1 and corrosion test 2 are presented below in Table 8 and Table 9, respectively.

TABLE 8

CORROSION TEST 1

| Sample | Coupon location | UN method-Aluminium Al7075-T6 mass loss (%) | UN method-Steel C1020 mass loss (%) | ASTM-Aluminium Al7075-T6 corrosion rate (mm/a) | ASTM-Steel C1020 corrosion rate (mm/a) |
|---|---|---|---|---|---|
| Stable Ferrous Product (ferrous from FeSO$_4$) | liquid | 2.4 | 2.7 | 1.0 | 1.0 |
|  | Liquid/gas | 1.7 | 2.7 | 0.7 | 1.0 |
|  | gas | 0.2 | 1.0 | 0.0 | 0.4 |
| Stable Ferrous Product (ferrous from SPL) | liquid | — | 10.8 | — | 4.1 |
|  | Liquid/gas | — | 7.4 | — | 2.8 |
|  | gas | — | 3.6 | — | 1.4 |
| Stable Ferrous Product (ferrous from FeCl$_2$*4 H$_2$O) | liquid | — | 6.4 | — | 2.5 |
|  | Liquid/gas | — | 4.1 | — | 1.6 |
|  | gas | — | 2.8 | — | 1.0 |

TABLE 9

CORROSION TEST 2

| Sample | Coupon location | UN method-Aluminium Al7075-T6 mass loss (%) | UN method-Steel C1020 mass loss (%) | ASTM-Aluminium Al7075-T6 corrosion rate (mm/a) | ASTM-Steel C1020 corrosion rate (mm/a) |
|---|---|---|---|---|---|
| Stable Ferrous Product (ferrous from FeSO$_4$) | liquid | 3.1 | 6.8 | 1.5 | 2.9 |
|  | Liquid/gas | 1.25 | 7.4 | 0.6 | 3.2 |
|  | gas | 0 | 0.8 | 0 | 2 |
| Stable Ferrous Product (ferrous from FeCl$_2$ (SPL)) | liquid | 100 | 7.9 | 46 | 3.4 |
|  | Liquid/gas | 78 | 5.4 | 37 | 2.3 |
|  | gas | 0.4 | 1.25 | 0.2 | 0.5 |

Bold: corrosive according to UN standard

Summary tables of the results of corrosion test 1 and corrosion test 2 are presented below in Table 10 and Table 11, respectively.

TABLE 10

CORROSION TEST 1 SUMMARY TABLE

| Sample | Coupon location | Steel C1020 corrosion rate (mm/a) | Aluminum Al7075-T6 corrosion rate (mm/a) |
|---|---|---|---|
| FeSO$_4$ pH = 5.0 | liquid | 1.0 | 1.0 |
| FeSO$_4$ pH = 4 | liquid | 3.1 | 1.5 |

TABLE 11

CORROSION TEST 2 SUMMARY TABLE

| Sample | Coupon location | Steel C1020 corrosion rate (mm/a) | Aluminum Al7075-T6 corrosion rate (mm/a) |
|---|---|---|---|
| FeCl$_2$ from SPL pH = 4 | liquid | 2.5 | — |
| FeCl$_2$ from SPL pH = 3.5 | liquid | 3.4 | 46 |

Bold: corrosive according to UN standard

The results of the corrosion tests demonstrated that the corrosion rate for the stable ferrous product(s) comprising ferrous from ferrous sulfate samples at pH 4-5 were less than 6.25 mm/year at 55° C. for both steel and aluminum coupons, which indicated that no corrosive labeling would be required for stable ferrous products comprising ferrous from ferrous sulfate according to UN transportation regulations.

The results further demonstrated that stable ferrous product(s) comprising ferrous from ferrous chloride at pH 3.5-4 were non-corrosive for steel metal by UN test method standards.

Example 5: Corrosion Tests of Stable Ferrous Products

In the present example, the corrosion rates of various different stable ferrous product were measured using a procedure as generally described in Example 6. It is noted that a liquid is classified as corrosive according to United Nation (UN) transportation regulation if a metal specimen (coupon), such as steel or aluminum, are corroded at a rate grater of 6.25 mm/year at 55° C. Furthermore, according to the UN test method, the test is considered positive if, for any metal specimen, the mass loss of the metal specimen is more than 13.5% when the exposure time is 7 days.

The following stable ferrous products were used in corrosion test 1 of the present example:

Corrosion test 1 was performed with the following compositions comprising a stable ferrous product: stable ferrous product comprising ferrous from $FeSO_4$ (copperas): Fe=5.25%, pH=5, and Na-citrate=1.5%; stable ferrous product comprising ferrous from $FeCl_2$ (SPL): Fe=11%, pH=4, and Na-citrate=2%; stable ferrous product comprising ferrous from $FeCl_2$ ($FeCl_2$*4 $H_2O$): Fe=9.6%, pH=4, and Na-citrate=2%. The results obtained from corrosion test 1 are presented in Table 12 below.

TABLE 12

| | | | | | |
|---|---|---|---|---|---|
| | | | | Aluminum | - Steel |
| | | Aluminum | | A17075-T6 | C1020 |
| | | A17075-T6 | Steel C1020 | corrosion | corrosion |
| | Coupon | mass loss | mass loss | rate | rate |
| Sample | location | (%) | (%) | (mm/a) | (mm/a) |
| 1- $FeSO_4$ | liquid | 2.4 | 2.7 | 1.0 | 1.0 |
| Fe = 5.2% | Liquid/gas | 1.7 | 2.7 | 0.7 | 1.0 |
| pH = 5 | gas | 0.2 | 1.0 | 0.0 | 0.4 |
| 2- $FeCl_2$ | liquid | — | 10.8 | — | 4.1 |
| Fe = 11% | Liquid/gas | — | 7.4 | — | 2.8 |
| pH = 4 | gas | — | 3.6 | — | 1.4 |
| 3- $FeCl_2$ | liquid | — | 6.4 | — | 2.5 |
| Fe = 9.6% | Liquid/gas | — | 4.1 | — | 1.6 |
| pH = 4 | gas | — | 2.8 | — | 1.0 |

Corrosion test 2 was performed with the following compositions comprising a stable ferrous product: stable ferrous product comprising ferrous from $FeSO_4$ (copperas): Fe=5%, pH=4, and Na-citrate=1.5%; stable ferrous product comprising ferrous from $FeCl_2$ (SPL): Fe=10%, pH=3.5, and Na-citrate=2%. The results obtained from Corrosion test 2 are presented in Table 13 below.

TABLE 13

| | | | | | |
|---|---|---|---|---|---|
| | | | | Aluminum | Steel |
| | | Aluminum | | A17075-T6 | C1020 |
| | | A17075-T6 | Steel C1020 | corrosion | corrosion |
| | Coupon | mass loss | mass loss | rate | rate |
| Sample | location | (%) | (%) | (mm/a) | (mm/a) |
| 1- $FeSO_4$ | liquid | 3.1 | 6.8 | 1.5 | 2.9 |
| Fe = 5% | Liquid/gas | 1.5 | 7.4 | 0.6 | 3.2 |
| pH = 4 | gas | 0 | 0.8 | 0 | 2 |
| 2- $FeCl_2$ | liquid | 100 | 7.9 | 46 | 3.4 |
| Fe = 10% | Liquid/gas | 78 | 5.4 | 37 | 2.3 |
| pH = 3.5 | gas | 0.4 | 1.25 | 0.2 | 0.5 | bold: corrosive according to the UN regulation

Corrosion test 3 was performed with the following compositions comprising a stable ferrous product: stable ferrous product comprising ferrous from $FeCl_2$ (SPL): Fe=10%, pH=5, and Na-citrate=2%; stable ferrous product comprising ferrous from $FeCl_2$ (SPL): Fe=5%, pH=5.7, and Na-citrate=2%. The results obtained from Corrosion test 3 are presented in Table 14 below.

TABLE 14

CORROSION TEST 3

| Sample | Coupon location | Aluminum Al7075- T6 mass loss (%) | Aluminum Al7075-T6 corrosion rate (mm/a) |
|---|---|---|---|
| 1- $FeCl_2$ | liquid | 100 | 46.12 |
| Fe = 10%, | Liquid/gas | 26.3 | 57.9 |
| pH = 5 | gas | 0.4 | 0.9 |
| 2- $FeCl_2$ | liquid | 26.1 | 12.03 |
| Fe = 4.7 | Liquid/gas | 24.4 | 11.2 |
| pH = 5.7 | gas | 0.6 | 0.2 | bold: corrosive according to the UN regulation

Corrosion test 4 was performed was performed with the following compositions comprising a stable ferrous product: stable ferrous product comprising a blend of ferrous from $FeSO_4$ and $FeCl_2$: Fe=10%, pH=3.8, $SO_4$=4.7%, Cl=9.8%, Na-citrate=2%; stable ferrous product comprising a blend of ferrous from $FeSO_4$ and $FeCl_2$: Fe=9.6%, pH=3.7, $SO_4$=6.4%, Cl=8%, Na-citrate=2%; stable ferrous product comprising a blend of ferrous from $FeSO_4$ and $FeCl_2$: Fe=9.3%, pH=3.8, $SO_4$=7.1%, Cl=7%, Na-citrate=2%; stable ferrous product comprising a blend of ferrous from $FeSO_4$ and $FeCl_2$: Fe=8.6%, pH=4, $SO_4$=8.9%, Cl=5.3%, Na-citrate=2%; stable ferrous product comprising a blend of ferrous from $FeSO_4$ and $FeCl_2$: Fe=8.5%, pH=4.1, $SO_4$=11%, Cl=3.7%, Na-citrate=2%); stable ferrous product comprising a blend of ferrous from $FeSO_4$ and $FeCl_2$: Fe=8%, pH=4.3, $SO_4$=12%, Cl=2.4%, Na-citrate=2%. The results obtained from Corrosion test 4 are presented in Table 15 below.

TABLE 15

CORROSION TEST 4

| Sample | Coupon location | Aluminium Al7075-T6 mass loss (%) | Aluminium Al7075-T6 corrosion rate (mm/a) |
|---|---|---|---|
| $FeSO_4$ and $FeCl_2$ blends | liquid | 45.6 | 100.0 |
| pH = 3.8, SO4 = 4.7%, | Liquid/gas | 33.5 | 74.4 |
| Cl = 9.8%, Fe = 10% | gas | 0.4 | 1.0 |
| $FeSO_4$ and $FeCl_2$ blends | liquid | 32.5 | 73.8 |
| pH = 3.7, SO4 = 6.4%, | Liquid/gas | 29.3 | 67.6 |
| Cl= 8%, Fe = 9.6% | gas | 0.1 | 0.4 |
| $FeSO_4$ and $FeCl_2$ blends | liquid | 30.2 | 66.6 |
| pH =3.8, SO4 = 7.1%, | Liquid/gas | 16.3 | 36.1 |
| Cl = 7%, Fe = 9.3% | gas | 0.2 | 0.6 |
| $FeSO_4$ and $FeCl_2$ blends | liquid | 24.5 | 55.5 |
| pH = 4, SO4 = 8.9%, | Liquid/gas | 14.5 | 32.9 |
| Cl = 5.3%, Fe = 8.6% | gas | 0.1 | 0.4 |
| $FeSO_4$ and $FeCl_2$ blends | liquid | 24.6 | 56.6 |
| pH = 4.1, SO4 = 11%, | Liquid/gas | 7.0 | 16.5 |
| Cl = 3.7%, Fe = 8..5% | gas | 0.0 | 0.3 |
| $FeSO_4$ and $FeCl_2$ blends | liquid | 20.4 | 45.3 |
| pH = 4.3, SO4 = 12%, | Liquid/gas | 9.7 | 21.7 |
| Cl = 2.4%, Fe = 8% | gas | 0.0 | 0.2 | bold: corrosive according to the UN regulation

The results of Corrosion tests 1-4 are summarized in Table 16 below.

TABLE 16

SUMMARY OF CORROSION TESTS 1-4

| Source of Ferrous in Sample | Fe | Cl | $SO_4$ | pH | Aluminum Al7075-T6 corrosion rate (mm/a) | Steel C1020 corrosion rate (mm/a) |
|---|---|---|---|---|---|---|
| $FeCl_2$ | 11 | 13.9 | 0 | 4 | — | 4.1 |
| $FeCl_2$ | 9.6 | 12.2 | 0 | 4 | — | 2.5 |
| $FeCl_2$ | 10 | 12.7 | 0 | 3.5 | 46 | 3.4 |
| $FeCl_2$ | 8.9 | 11 | 0 | 5 | 46 | — |
| $FeCl_2$ | 4.7 | 6.5 | 0 | 5.7 | 12 | — |
| $FeCl_2$ and $FeSO_4$ blends | 10 | 9.8 | 4.7 | 3.8 | 45 | — |
| $FeCl_2$ and $FeSO_4$ blends | 9.6 | 8 | 6.4 | 3.7 | 32 | — |
| $FeCl_2$ and $FeSO_4$ blends | 9.3 | 7 | 7.1 | 3.8 | 30 | — |
| $FeCl_2$ and $FeSO_4$ blends | 8.6 | 5.3 | 8.9 | 4 | 24 | — |
| $FeCl_2$ and $FeSO_4$ blends | 8.5 | 3.7 | 11 | 4.1 | 24 | — |
| $FeCl_2$ and $FeSO_4$ blends | 8 | 2.4 | 12 | 4.3 | 20 | — |
| $FeSO_4$ | 5.2 | 0 | 14 | 5.0 | 1 | 1 |
| $FeSO_4$ | 5 | 0 | 13.5 | 4 | 1.5 | 2.9 | bold: corrosive according to UN regulation

The results of the corrosion tests demonstrated that stable ferrous products comprising ferrous from $FeSO_4$ at pH 4 to 5 were classified as non-corrosive according to the UN regulation standards based on the UN test method standards for dangerous goods. The results of the corrosion tests demonstrated that stable ferrous products comprising ferrous from $FeCl_2$ at pH 3.5-5.7 were classified as corrosive for aluminum metals according to the UN regulation standards based on the UN test method standards for dangerous goods due to exceeding the corrosion limit for aluminum metals. However, stable ferrous products comprising ferrous from $FeCl_2$ at pH 3.5-5.7 were classified as corrosive for steel metals according to the UN regulation standards based on the UN test method standards for dangerous goods. It was noted that all blended products were corrosive to aluminum metal.

In the preceding disclosure which includes the examples, different procedures and various steps have been described. It will, however, be evident that various modifications and changes may be made thereto, and additional procedures may be implemented, without departing from the broader scope of the procedures as set forth in the claims that follow.

The invention claimed is:

1. A method for treating a fluid in need of treatment, wherein said method comprises adding an effective amount of at least one coagulant composition, wherein said coagulant composition comprises one or more coagulants, which one or more coagulants comprise at least one stable ferrous product, and further wherein said stable ferrous product comprises:
   i. one or more ferrous ($Fe^{2+}$) comprising compounds;
   ii. one or more citrate-based stabilizers; and
   iii. a pH value of from 4.0 to 6.0;
and wherein
(a) said one or more citrate-based stabilizers maintain the stability of said coagulant composition and/or prevent the oxidation of said ferrous compound in said coagulant composition;
(b) the stable ferrous product comprises from 0.10% to less than 5.0% by weight of said citrate-based stabilizer,
(c) said one or more citrate-based stabilizers maintain the stability of said coagulant composition and prevent the oxidation of said ferrous compound in said coagulant composition; and
(d) the coagulant composition does not contain ($Fe^{3+}$) compounds.

2. The method of claim 1, wherein:
   (i) the one or more stable ferrous products comprise from about 0.10% to about 3.00% by weight of citrate-based stabilizer;
   (ii) the one or more stable ferrous products comprise more than 5.0% of Fe by weight;
   (iii) said coagulant composition comprises less than 20% by weight hydrogen peroxide;
   (iv) said fluid in need of treatment comprises sulfide;
   (v) said fluid in need of treatment comprises sulfide and treatment of said fluid results in 75% or less, 75% or more, 80% or more, 85% or more, 90% or more, 95% or more, 99% or more, or 100% removal of sulfide from said fluid in need of treatment;
   (vi) said one or more ferrous comprising compounds include ferrous sulfate and ferrous chloride;
   (vii) said one or more ferrous comprising compounds comprise ferrous chloride tetrahydrate and/or ferrous chloride from spent pickling liquor;
   (viii) said one or more ferrous comprising compounds include ferrous sulfate which comprises copperas;
   (ix) the citrate-based stabilizer comprises trisodium citrate;
   (x) the amount of the one or more stable ferrous products in the coagulant composition is comprise about 2% or less, about 2% or more, about 2.5% or more, about 3.0% or more, about 3.5% or more, about 4.0% or more, about 4.5% or more, about 5.0% or more, about 5.5% or more, about 6.0% or more, about 6.5% or more, about 7.0% or more, about 7.5% or more, about 8.0% or more, about 8.5% or more, about 9.0% or more, about 9.5% or more, about 10.0% or more, about 11.0% or more, about 12.0% or more, about 13.0% or more, about 14.0% or more, or about 15.0% or more of Fe by weight;
   (xi) the one or more stable ferrous products comprise about 0.10% or less, about 0.10% or more, about 0.20% or more, about 0.30% or more, about 0.40% or more, about 0.50% or more, about 0.75% or more, about 1.00% or more, about 1.25% or more, about 1.50% or more, about 1.75% or more, about 2.00% or more, about 2.25% or more, about 2.50% or more, about 2.75% or more, or about 3.00% or more of stabilizer by weight;
   (xii) said one or more stable ferrous products comprise from about 2% to about 15% Fe by weight, about 0.1% to about 3.0% citrate by weight, and a pH value for from about 3.0 to about 6.0;
   (xiii) the one or more stable ferrous products are stable at 0° C. for 1 week or more, for 2 weeks or more, for 3 weeks or more, for 4 weeks or more, for 5 weeks or more, for 6 weeks or more, for 7 weeks or more, for 8 weeks or more, for 9 weeks or more, for 10 weeks or more, for 12 weeks or more, for 14 weeks or more, for 16 weeks or more, for 18 weeks or more, for 20 weeks or more, for 22 weeks or more, or for 24 weeks or more;
   (xiv) the one or more stable ferrous products are stable at 20° C. for 1 week or more, for 2 weeks or more, for 3 weeks or more, for 4 weeks or more, for 5 weeks or more, for 6 weeks or more, for 7 weeks or more, for 8 weeks or more, for 9 weeks or more, for 10 weeks or more, for 12 weeks or more, for 14 weeks or more, for 16 weeks or more, for 18 weeks or more, for 20 weeks or more, for 22 weeks or more, or for 24 weeks or more;
   (xv) the one or more stable ferrous products are stable at room temperature for 1 week or more, for 2 weeks or more, for 3 weeks or more, for 4 weeks or more, for 5 weeks or more, for 6 weeks or more, for 7 weeks or more, for 8 weeks or more, for 9 weeks or more, for 10 weeks or more, for 12 weeks or more, for 14 weeks or more, for 16 weeks or more, for 18 weeks or more, for 20 weeks or more, for 22 weeks or more, or for 24 weeks or more;
   (xvi) the one or more stable ferrous products are stable at 50° C. for 1 week or more, for 2 weeks or more, for 3 weeks or more, for 4 weeks or more, for 5 weeks or more, for 6 weeks or more, for 7 weeks or more, for 8 weeks or more, for 9 weeks or more, for 10 weeks or more, for 12 weeks or more, for 14 weeks or more, for 16 weeks or more, for 18 weeks or more, for 20 weeks or more, for 22 weeks or more, or for 24 weeks or more; or
   (xvii) any combination of the foregoing.

3. The method of claim 1, wherein:
   (i) the one or more stable ferrous products are non-corrosive;
   (ii) the one or more stable ferrous products are non-corrosive by the United Nations test method standard;
   (iii) the stable ferrous product results in less than 13.5% mass loss of a metal specimen when the exposure time is 7 days to said stable ferrous product;
   (iv) the stable ferrous product is non-corrosive to steel;
   (v) the stable ferrous product is non-corrosive to aluminum;
   (vi) the corrosion rate of said stable ferrous product is 6.25 or less or 1.0 or less mm/year at 55° C. steel and/or aluminum coupons;
   (vii) the fluid in need of treatment comprises one or more digesters;

(viii) the fluid in need of treatment comprises a fluid used in, or in conjunction with, or as a part of a process of, any one or more of the following: sewer networks; pumping stations; wastewater treatment plants, deep and shallow wells, wells close to sewer lines, surface water that is close to a septic system; industrial effluent; static contaminated water; and/or wastewater comprising digesters;

(ix) the fluid in need of treatment comprises heavy metals, oil, grease, and/or sludge;

(x) the fluid in need of treatment comprises an effluent;

(xi) the fluid in need of treatment comprises produced water;

(xii) the fluid in need of treatment comprises sewage water;

(xiii) the method further comprises adding one or more other coagulants to said fluid in need of treatment;

(xiv) said method further comprises adding one or more biocides to said fluid in need of treatment;

(xv) said method further comprises adding one or more oxidizing biocides and/or one or more non-oxidizing biocides to said fluid in need of treatment;

(xvi) said method comprises adding an amount of said coagulant comprising one or more stable ferrous products to said fluid in need of treatment that is effective to remove one or more contaminants from said fluid in need of treatment; or (xvii) any combination of the foregoing.

4. The method of claim 1, wherein the stable ferrous product comprises from about 0.10% to about 3.00% by weight of said citrate-based stabilizer.

5. The method of claim 1, wherein the stable ferrous product comprises more than 5.0% of Fe by weight.

6. The method of claim 1, wherein said coagulant composition comprises less than 5% by weight of hydrogen peroxide.

7. The method of claim 1, wherein said coagulant composition does not comprise an appreciable or biocidally effective amount of hydrogen peroxide.

8. The method of claim 1, wherein the fluid in need of treatment comprises produced water.

9. The method of claim 1, wherein the fluid in need of treatment comprises at least 1 mg/kg sulfide concentration.

10. The method of claim 1, wherein the fluid in need of treatment comprises at least 5 mg/kg sulfide concentration.

* * * * *